United States Patent
Hayashi et al.

(10) Patent No.: US 8,395,672 B2
(45) Date of Patent: Mar. 12, 2013

(54) IMAGING DEVICE THAT DETECTS INCLINATION OF IMAGE AND APPARATUS IN A ROLLING DIRECTION

(75) Inventors: Kenichi Hayashi, Nara (JP); Masanobu Tanaka, Osaka (JP); Atsuo Ochi, Tokyo (JP); Hiroya Kusaka, Hyogo (JP); Hideyuki Hashi, Osaka (JP)

(73) Assignee: Panasonic Corporation, Osaka (JP)

( * ) Notice: Subject to any disclaimer, the term of this patent is extended or adjusted under 35 U.S.C. 154(b) by 453 days.

(21) Appl. No.: 12/668,496

(22) PCT Filed: Jul. 8, 2008

(86) PCT No.: PCT/JP2008/001828
§ 371 (c)(1),
(2), (4) Date: Jan. 11, 2010

(87) PCT Pub. No.: WO2009/011105
PCT Pub. Date: Jan. 22, 2009

(65) Prior Publication Data
US 2010/0177198 A1 Jul. 15, 2010

(30) Foreign Application Priority Data

Jul. 13, 2007 (JP) ................................. 2007-183957

(51) Int. Cl.
*H04N 5/228* (2006.01)
*G06K 9/40* (2006.01)
*G06K 9/36* (2006.01)
*G06K 9/32* (2006.01)

(52) U.S. Cl. ........... 348/208.99; 348/208.2; 348/208.11; 348/208.4; 348/208.5; 382/275; 382/289; 382/296; 396/53; 396/52; 396/54

(58) Field of Classification Search .......... 348/208.99–208.16, 208.13, 208.11; 396/53, 52, 54; 382/254, 275, 289, 293, 294, 295, 296
See application file for complete search history.

(56) References Cited

U.S. PATENT DOCUMENTS

| 5,852,750 | A * | 12/1998 | Kai et al. | 396/55 |
| 7,978,222 | B2 * | 7/2011 | Schneider | 348/208.5 |
| 8,089,519 | B2 * | 1/2012 | Uenaka | 348/208.7 |
| 2004/0212699 | A1 * | 10/2004 | Molgaard | 348/231.99 |

(Continued)

FOREIGN PATENT DOCUMENTS

| JP | 58-182976 A | 10/1983 |
| JP | 04-331586 A | 11/1992 |

(Continued)

OTHER PUBLICATIONS

International Search Report for PCT/JP2008/001828, PCT—International Report date: Oct. 7, 2008.

*Primary Examiner* — Nhan T Tran
*Assistant Examiner* — Marly Camargo
(74) *Attorney, Agent, or Firm* — Pearne & Gordon LLP

(57) ABSTRACT

An imaging device capable of detecting and correcting, with high accuracy, the motion (image rotation) in the rolling direction of the image caused by the camera shake during imaging without being influenced by the individual variation, temperature characteristic, and variation with time of the sensor. To correct the motion (image rotation) in the rolling direction of the image caused by the camera shake during imaging, the result of detection of the angle of inclination of the device by an angle sensor (8a) is corrected with the result of detection of the angle of inclination of the image on the basis of the feature of the captured image by an image inclination detecting section (7), and the imaging device (3) is rotated around the optical axis or an axis parallel to the optical axis according to the corrected angle of inclination of the device.

11 Claims, 33 Drawing Sheets

U.S. PATENT DOCUMENTS

| | | | |
|---|---|---|---|
| 2005/0270380 A1* | 12/2005 | Tomita et al. | 348/208.99 |
| 2006/0165395 A1* | 7/2006 | Shimano et al. | 396/54 |
| 2007/0126883 A1* | 6/2007 | Ishige et al. | 348/211.14 |
| 2008/0145041 A1* | 6/2008 | Enomoto | 396/53 |

FOREIGN PATENT DOCUMENTS

| | | |
|---|---|---|
| JP | 10-150596 A | 6/1998 |
| JP | 10-257367 A | 9/1998 |
| JP | 11-088758 A | 3/1999 |
| JP | 11-136575 A | 5/1999 |
| JP | 2001-177850 A | 6/2001 |
| JP | 2001-251552 A | 9/2001 |
| JP | 2002-262155 A | 9/2002 |
| JP | 2002-344723 A | 11/2002 |
| JP | 2005-348212 A | 12/2005 |

* cited by examiner

| 0 | 1 | 0 |
|---|---|---|
| 1 | -4 | 1 |
| 0 | 1 | 0 |

FIG.6A

IMAGING DEVICE THAT DETECTS INCLINATION OF IMAGE AND APPARATUS IN A ROLLING DIRECTION

TECHNICAL FIELD

The present invention relates to an imaging apparatus with a camera shake correcting function.

BACKGROUND ART

With reductions in size and weight and escalation in the magnification of optical zooming of consumer digital cameras and video cameras (hereinafter referred to as "video movie") in recent years, they have become significantly convenient, and, as a result, digital cameras and video movies has become one of home appliances used in daily life of general consumers. On the other hand, the reductions in size and weight and escalation in the magnification of optical zooming, and popularization of those products for consumers unfamiliar with shooting images also involve a problem that the camera shake upon image-shooting makes the screen unstable. Therefore, in order to solve this problem, many digital cameras and video movies with an image motion correcting device have been now developed and commercialized. However, these existing image motion correcting devices are designed to correct motion of an image due to the camera shake in the vertical direction (i.e. pitching direction) and in the horizontal direction (i.e. yawing direction). However, the camera shake of digital cameras and video movies upon image-shooting is not limited to those in the vertical direction and horizontal direction, and, for example, the camera shake in a rolling direction may also occur which causes the image to be rotated about an optical axis or an axis parallel to the optical axis.

Thus, there are several proposals of an apparatus for correcting shakes (image rotation) in the rolling direction upon image-shooting as shown below.

For example, Patent Document 1 discloses a video movie including a detecting means that detects inclination of a camera body, a means that judges the degree of inclination according to a signal obtained in the detecting means, a rotating means that rotates an imaging element and a controlling means that controls the rotation means. Patent Document 1 discloses an example of adopting a means using gravity or acceleration as a means for detecting the inclination of the camera and driving the rotation of imaging elements according to the inclination of the camera body to eliminate the inclination (shakes in a rolling direction) of a shot image.

Furthermore, for example, Patent Document 2 discloses an imaging apparatus that images a subject, having an imaging section that acquires an image of the subject, a condition memory that stores detection conditions for detecting a linear component of equal to or greater than a predetermined length out of edge components of the subject, and an image processing section that detects an image element corresponding to the linear component from the image based on the detection condition and detects a geometric difference between the detected image element and a predetermined reference for the inclination of the linear component. Patent Document 2 presents an example where an image obtained from an imaging section is processed, an inclination of the image is detected based on a detected edge component and the inclination (i.e. shakes in the rolling direction) of the shot image is corrected using the inclination of the image obtained.

Patent Document 1: Japanese Patent Application Laid-Open No. HEI4-331586

Patent Document 2: Japanese Patent Application Laid-Open No. 2002-344723

DISCLOSURE OF INVENTION

Problems to be Solved by the Invention

It is known that various methods are proposed about an apparatus for correcting the shakes (image rotation) in a rolling direction, but there still remain some problems to be solved with these methods. One of such problems is that when a physical sensor such as an acceleration sensor is used as means for detecting the shakes in the rolling direction, individual variations, temperature characteristics and aging of the sensors are unavoidable, and it is therefore difficult to keep the accuracy of detected inclination high.

In this respect, when a means that detects the inclination of a shot image from characteristics of the image is used as a means for detecting the shakes in the rolling direction, image processing involves electronic signal processing, so that individual variations, temperature characteristics and aging can not occur. However, when the inclination of an image is detected from the characteristics of the shot images, the cycle in which information related to inclination can be acquired is constrained by the shooting cycle of the images, and it is not possible to obtain information related to inclination in a desired, fast cycle. For example, in the case of a video camera whose television scheme is the NTSC scheme, images are shot at intervals of approximately 16.6 milliseconds, and it is not possible to acquire inclination information of images in a faster cycle. That is, the detection of inclination is delayed. That is, when rotation of an imaging element or the like is mechanically driven to correct the inclination of a shot image, the mechanical section can not be driven with a sufficiently high operation frequency owing to this detection delay, which may prevent the realization of accurate inclination correction. In that regard, the sensor can detect the inclination substantially in real time without being constrained by the shooting cycle of the image.

It is therefore an object of the present invention to provide an imaging apparatus capable of accurately detecting image shakes in the rolling direction (i.e. image rotation) caused by the camera shakes and other factors upon image-shooting without any influence caused by individual variations, temperature characteristics and aging of the sensors.

Means for Solving the Problem

In order to solve the above described problems, the imaging apparatus according to a first aspect of the invention provided with an imaging optical system that forms an optical image of a subject and an imaging element that receives the optical image formed, converts the image to an electrical image signal and outputs the signal, including an apparatus inclination angle detecting section that detects an angle of inclination of the imaging apparatus in a rolling direction, an image inclination angle detecting section that detects an angle of inclination in the rolling direction of the image received from the image signal, and an apparatus inclination angle calculation section that calibrates a detection result of the apparatus inclination angle detecting section with the angle of inclination detected in the image inclination angle detecting section and calculates an apparatus inclination angle. This allows image shakes (image rotation) in the rolling direction due to the camera shake during image-shooting to be detected accurately without being influenced by individual variations, temperature characteristics and aging of the sensors.

The imaging apparatus according to a second aspect of the invention, based on the imaging apparatus according to the first aspect of the invention above, is configured in such a way that an inclination correcting section is further provided that corrects an inclination of the imaging apparatus based on the calculation result in the apparatus inclination angle calculation section. This allows the shake (image rotation) in the rolling direction of an image caused by the camera shake or the like during image-shooting to be corrected accurately.

The imaging apparatus according to a third aspect of the invention, based on the imaging apparatus according to the second aspect of the invention above, is configured in such a way that the inclination correcting section rotates the imaging element about an optical axis or an axis parallel to the optical axis or rotates the electrical image, based on the calculation result in the apparatus inclination angle calculation section. This allows the shake (image rotation) in the rolling direction of an image caused by the camera shake or the like during image-shooting to be corrected accurately.

The imaging apparatus according to a fourth aspect of the invention, based on the imaging apparatus according to the third aspect of the invention above, is configured in such a way that a lens barrel is further provided that houses the imaging optical system and has the imaging element fixed thereto, and, the inclination correcting section rotates the imaging element about the optical axis or about the axis parallel to the optical axis based on the calculation result in the apparatus inclination angle calculation section. This allows the shake (image rotation) in the rolling direction of an image caused by the camera shake or the like during image-shooting to be corrected accurately.

The imaging apparatus according to a fifth aspect of the invention, based on the imaging apparatus according to the third or fourth aspect of the invention above, is configured in such a way that the inclination correcting section rotates the imaging element about the optical axis or about the axis parallel to the optical axis so that a horizontal or vertical of the image converted to the image signal matches that of the subject. Thus, by performing correction using many horizontal or vertical line segments included in a shot image, it is possible to improve the accuracy of correction.

The imaging apparatus according to a sixth aspect of the invention, based on the imaging apparatus according to one of the third to fifth aspects of the invention above, is configured in such a way that the inclination correcting section starts the operation of rotating the imaging element or lens barrel about the optical axis or about the axis parallel to the optical axis after the first calibration is completed. Thus, inclination correction is performed using the correctly calibrated apparatus inclination angle and it is thereby possible to improve correction accuracy.

The imaging apparatus according to a seventh aspect of the invention, based on the imaging apparatus according to one of the first to sixth aspects of the invention above, is configured in such a way that an apparatus acceleration detecting section is further provided that detects acceleration in at least one axis perpendicular to the optical axis of the imaging optical system from the imaging apparatus toward the subject side and a reference inclination angle calculation section that calculates an angle of inclination in the rolling direction with respect to the subject using acceleration outputted from the apparatus acceleration detecting section, and, the image inclination angle detecting section receives the angle of inclination outputted from the reference inclination angle calculation section as an input value. Even if many line segments that may cause erroneous detection in the horizontal/vertical direction are included in a shot image, this allows for stable retention of the horizontality of the shot image.

The imaging apparatus according to an eighth aspect of the invention, based on the imaging apparatus according to one of the first to sixth aspect of the invention, is further provided with a camera shake correcting device having first and second actuators that drive a camera shake correcting section in two directions perpendicular to the optical axis of the imaging optical system and a reference inclination angle calculation section that receives drive current values of the first and second actuators as input and calculates an angle of inclination in the rolling direction with respect to the subject. The image inclination angle detecting section may receive the angle of inclination outputted from the reference inclination angle calculation section as an input value. Even if many line segments that may cause erroneous detection in the horizontal/vertical direction are included in a shot image, this allows for stable retention of the horizontality of the shot image.

The imaging apparatus according to a ninth aspect of the invention, based on the imaging apparatus according to one of the first to eighth aspects of the invention above, is configured in such a way that the apparatus inclination angle detecting section is one of an inclination sensor, acceleration sensor and angular velocity sensor. This allows for accurate detection of the apparatus inclination angle.

The imaging apparatus according to a tenth aspect of the invention, based on the imaging apparatus according to the ninth aspect of the invention above, is configured in such a way that the apparatus inclination angle detecting section is an angular velocity sensor, an angle variation calculation section is further provided that integrates the apparatus inclination angle detection result and calculates an angle variation in the rolling direction, and the apparatus inclination angle calculation section calibrates the angle variation using the image inclination angle detected in the image inclination angle detecting section and calculates an apparatus inclination angle. In this way, using also an angular velocity detection method such as a gyro sensor that detects Coriolis force for the apparatus inclination angle detecting section makes it possible to accurately detect the apparatus inclination angle without being influenced by acceleration other than acceleration of gravity at the time of postural change of the imaging apparatus (such as panning).

With the imaging apparatus according to an eleventh aspect of the invention, based on the imaging apparatus according to the tenth aspect of the invention above, is configured in such a way that the apparatus inclination angle calculation section has an apparatus inclination angle storage memory that stores the angle of inclination outputted from the apparatus inclination angle calculation section, a difference calculator that calculates a difference between the angle of inclination outputted from the apparatus inclination angle storage memory and the angle of inclination outputted from the image inclination angle detecting section, a difference value storage memory that stores the output of the difference calculator and a correction value calculation section that calculates a correction value to be added to the angle variation using the output of the difference value storage memory, and updates contents stored in the difference value storage memory according to operation timing of the image inclination angle detecting section and updates the apparatus inclination angle storage memory according to operation timing of the imaging element. Thus, the calculation result in the apparatus inclination angle calculation section is calibrated according to operation timing of the image inclination angle detecting section, and an accurate apparatus inclination angle can thereby be calculated.

The imaging apparatus according to a twelfth aspect of the invention, based on the imaging apparatus according to an eleventh aspect of the invention above, is configured in such a way that the correction value calculation section has a multiplier that multiplies the output of the difference value storage memory by a value obtained by dividing an operation frequency of the image inclination angle detecting section by an operation frequency of the angle variation calculation section and an integrator that adds up outputs from the multiplier. This makes it possible to prevent drastic variations of the correction value and realize stable correction.

Advantageous Effects of Invention

The present invention can provide an imaging apparatus capable of accurately detecting shakes (image rotation) in a rolling direction of an image caused by the camera shake or the like during image-shooting without being influenced by individual variations, temperature characteristics or aging of the sensors.

BRIEF DESCRIPTION OF DRAWINGS

FIG. 6A illustrates an example of weighting coefficients of a 3×3 Laplacian filter used for image inclination detection of the imaging apparatus according to Embodiment 1 of the present invention;

BEST MODE FOR CARRYING OUT THE INVENTION

Embodiments of the present invention will now be explained with reference to the accompanying drawings.

Embodiment 1

Figure 1:
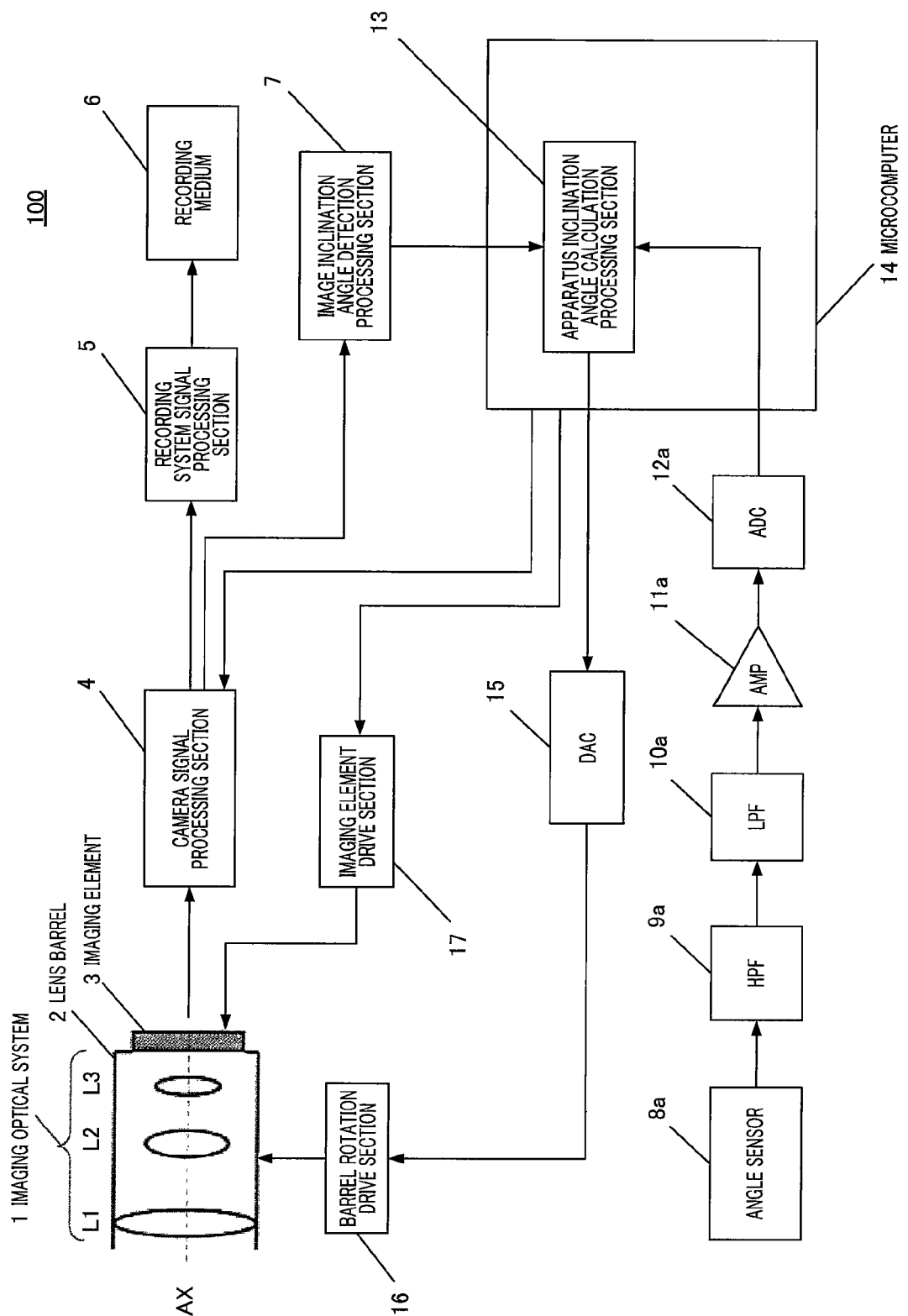
FIG. 1 is a block diagram illustrating a configuration of an imaging apparatus according to Embodiment 1 of the present invention.

First, imaging apparatus 100 according to Embodiment 1 of the present invention will be explained using FIG. 1 to FIG. 9. FIG. 1 is a block diagram illustrating a configuration of imaging apparatus 100 according to Embodiment 1 of the present invention. In FIG. 1, imaging optical system 1 has three lens groups L1, L2 and L3 arranged along an optical axis AX, provided to form an image of the subject on imaging element 3 and housed inside lens barrel 2. Furthermore, lens barrel 2 is configured to be freely rotatable about the optical axis AX of imaging optical system 1 and is rotated by barrel rotation drive section 16 (described later). Furthermore, in FIG. 1, each lens group has a single lens, but the lens group configuration is not limited to this and a plurality of lenses may be used to constitute a lens group.

Imaging element 3 is an imaging element that converts an image that enters through imaging optical system 1 to an electric signal, and to be more specific, CCD, CMOS or the like is used. In camera signal processing section 4, the image signal outputted from imaging element 3 is subjected to analog signal processing such as gain control processing and gamma processing and digital signal processing such as A/D conversion, noise cancellation and contour emphasis. After that, the signal is subjected to signal processing of a recording system such as compression by recording system signal processing section 5 and finally recorded in recording medium 6 made up of a semiconductor memory or the like. Image inclination angle detection processing section 7 electronically detects the inclination (angle) of the image from the output image signal of camera signal processing section 4.

Angle sensor 8a is a sensor installed in the body of imaging apparatus 100 to detect the inclination in the rolling direction of imaging apparatus 100 itself. Here, the direction that forms an angle of 90 degrees with respect to the gravity direction (vertical direction) is defined as a horizontal direction and this is defined as the reference angle (angle=0 degrees). Furthermore, the counterclockwise direction when the subject side is viewed from the imaging optical system is defined as the positive direction. Angle sensor 8a outputs angle signals in both positive and negative directions depending on the magnitude and direction of the inclination of imaging apparatus 100.

Figure 8:
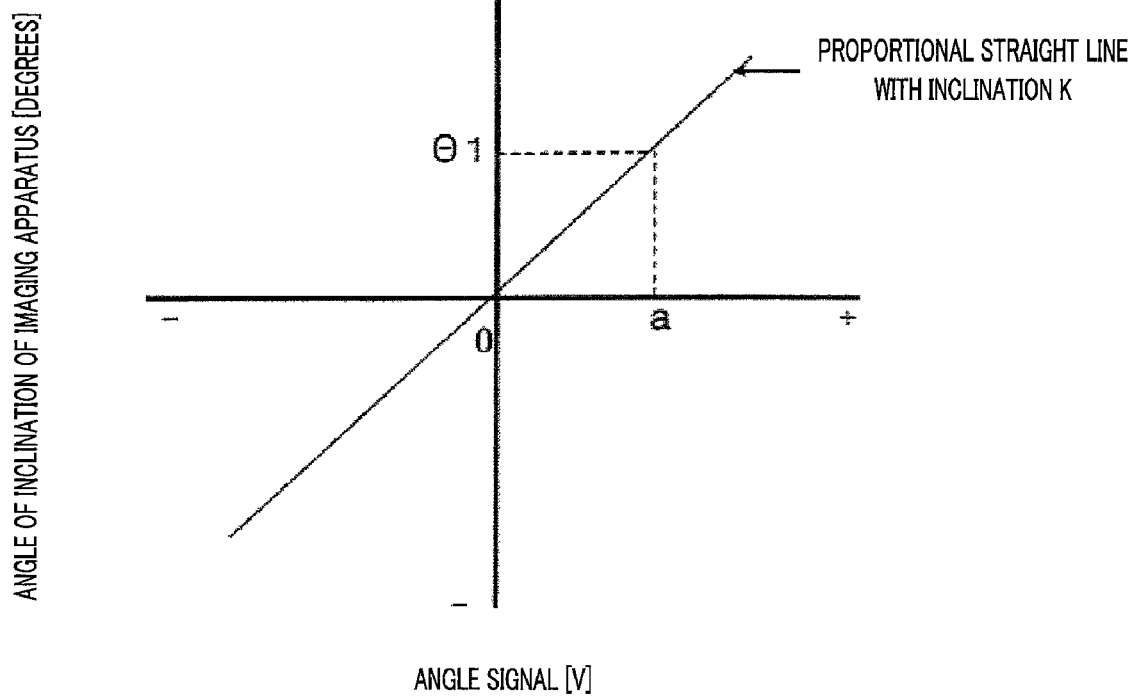
FIG. 8 illustrates an example of a conversion equation for converting an angle signal of the imaging apparatus to an angle according to Embodiment 1 of the present invention.

Here, the relationship between an angle signal and an angle (initial state) is such that, as shown in FIG. 8, an angle signal is outputted in proportion to the angle of inclination with respect to the reference in the horizontal direction (angle=0 degrees). Whether the angle signal is positive or negative depends on whether imaging apparatus 100 is inclined upward to the left or to the right with respect to the horizontal direction (angle=0 degrees and angle signal=0[V]). In the graph illustrating the relationship between the angle signal and angle shown in FIG. 8, if the inclination of a proportional straight line thereof is assumed to be K, the conversion equation for converting the angle signal into the angle is as follows.

$$\text{Angle} = K \times \text{angle signal} \tag{1}$$

HPF 9a is a high pass filter to remove, for example, the DC drift component in an unnecessary band component included in the output of angle sensor 8a. LPF 10a is a lowpass filter to remove, for example, a noise component in the unnecessary band component included in the output of angle sensor 8a. Amplifier (Amp) 11a is a signal amplifier that adjusts the signal level of the output of angle sensor 8a. A/D conversion (ADC) section 12a converts the output of amplifier 11a to a digital signal.

Microcomputer 14 calculates, through apparatus inclination angle calculation processing section 13 (processing in the microcomputer), the amount of drive control for driving the rotation of lens barrel 2 based on the output of angle sensor 8a received as input via A/D conversion section 12a and the angle of inclination of the image obtained from image inclination angle detection processing section 7 and sends a control signal indicating the amount of drive control to barrel rotation drive section 16 via D/A conversion (DAC) section 15. Substantially simultaneously with receipt of the signal from microcomputer 14, D/A conversion section 15 converts this signal to an analog signal and sends the converted control signal to barrel rotation drive section 16.

Barrel rotation drive section 16 is designed to drive the rotation of lens barrel 2 based on the control signal and thereby correct an inclination of an image to be shot, and has a motor and a motor driver to drive the rotation of lens barrel 2. Finally, imaging element drive section 17 controls the transfer of charge converted from the subject through imaging element 3.

Figure 2:
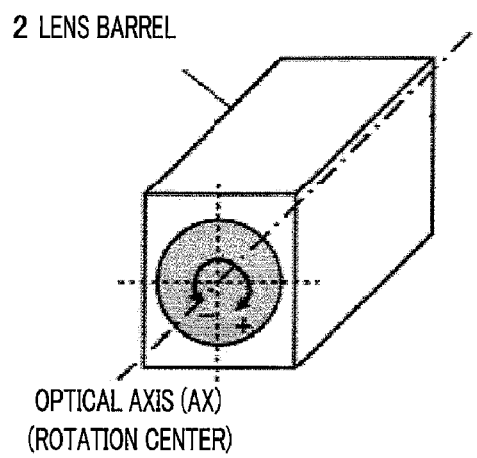
FIG. 2 is a schematic view illustrating a lens barrel and a rotation direction thereof of the imaging apparatus according to Embodiment 1 of the present invention.

FIG. 2 is a schematic view of lens barrel 2 of imaging apparatus 100 according to Embodiment 1 of the present invention and the rotation direction thereof. As shown in FIG. 2, the rotation of lens barrel 2 about the optical axis AX (single-dot dashed line) in a direction indicated by an arrow is driven by barrel rotation drive section 16 (not shown). Imaging element 3 is physically fixed to lens barrel 2. Therefore, when the rotation lens barrel 2 is driven, imaging element 3 also rotates integrally with lens barrel 2.

Figure 3:
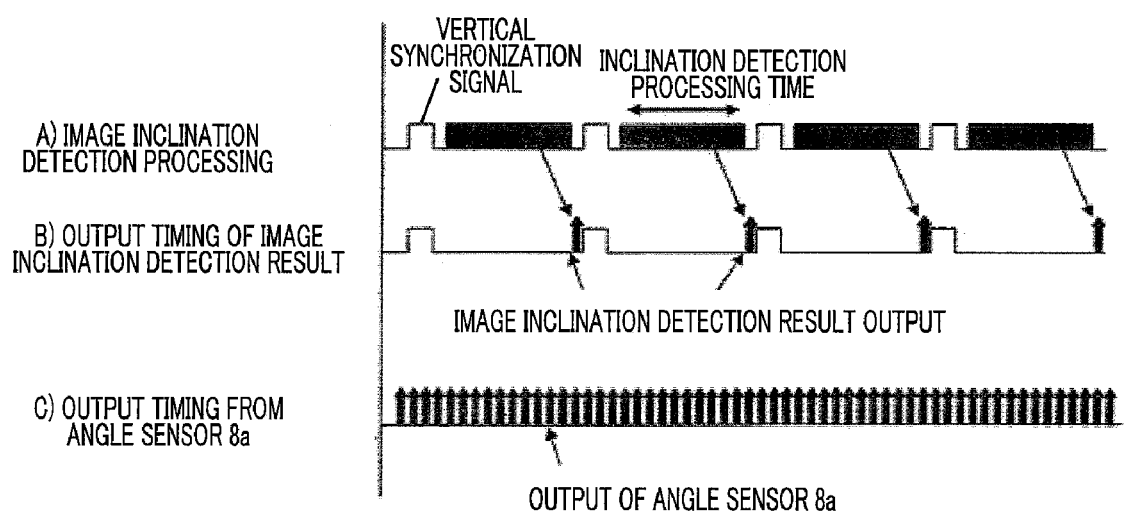
FIG. 3 is a schematic view illustrating an example of timing at which a microcomputer acquires the angle of inclination of a shot image outputted from the image inclination angle detection processing section and an angle signal on the inclination of the imaging apparatus according to Embodiment 1 of the present invention from the angle sensor.

FIG. 3 is a schematic view illustrating an example of timing at which microcomputer 14 acquires the angle of inclination of a shot image outputted from image inclination angle detection processing section 7 of imaging apparatus 100 according to Embodiment 1 of the present invention and an angle signal related to the inclination of imaging apparatus 100 from angle sensor 8a. In FIG. 3, A) illustrates a period required for processing that image inclination angle detection processing section 7 detects the inclination of the shot image. In Embodiment 1, suppose image inclination angle detection processing section 7 detects the angle of inclination from the shot image over one vertical scan period. B) illustrates the timing (shown by an arrow) at which image inclination angle detection processing section 7 outputs the angle of inclination of the detected image to microcomputer 14. C) illustrates the timing at which the angle signal of imaging apparatus 100 itself detected by angle sensor 8a is received as input in microcomputer 14. As shown in B) and C), suppose the angle of inclination of the shot image is obtained from image inclination angle detection processing section 7 once every one vertical scan period and the angle signal from angle sensor 8a is received as input in microcomputer 14 more frequently. In the following explanations of Embodiment 1, as an example, suppose the number of frames in a shot image per second is 60 (where one vertical scan period is approximately 16.6 milliseconds), and microcomputer 14 receives as input angle signals from angle sensor 8a 600 times per second.

Figure 4:
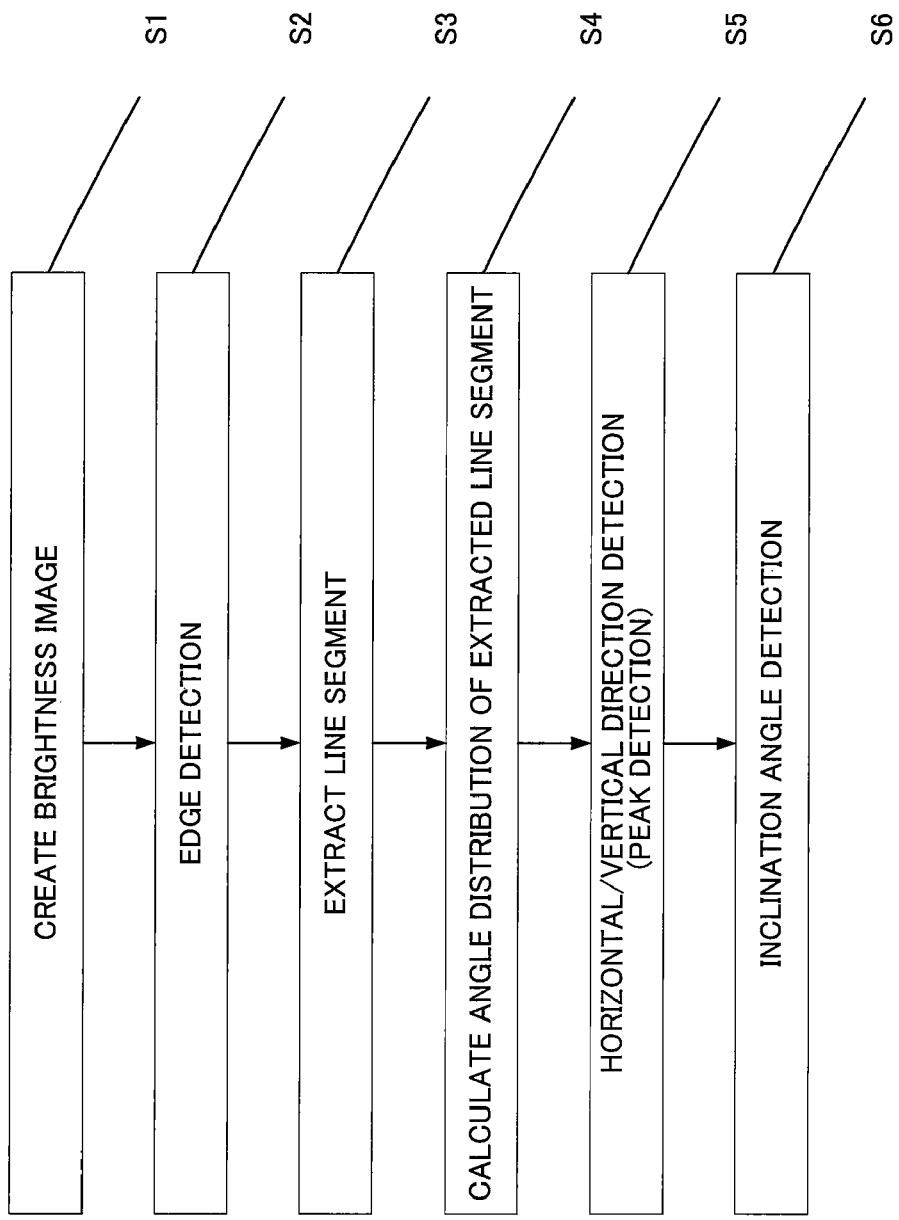
FIG. 4 is a flowchart of image inclination angle detection processing by the imaging apparatus according to Embodiment 1 of the present invention.

Here, operation of image inclination angle detection processing section 7 will be explained. FIG. 4 is a flowchart of image inclination angle detection processing by imaging apparatus 100 according to Embodiment 1 of the present invention, and FIG. 5A, FIG. 5B, FIG. 5C and FIG. 5D illustrate steps in the image inclination angle detection processing. First of all, the image inclination angle detection processing (microcomputer) executed by image inclination angle detection processing section 7 will be explained. This processing focuses on the linear components included in an image. Taking advantage of the fact that many lines in the horizontal direction and vertical direction such as various structures such as buildings, ground surfaces, horizons or the like are generally included, the angle of inclination is calculated by detecting the horizontal and vertical directions in an image. Image inclination angle detection processing section 7 has a calculation processing section and a frame memory (not shown). The image received from camera signal processing section 4 is stored in the frame memory and the following processing is performed while exchanging data with the calculation processing section.

In step S1, a brightness image is created. Assuming that, in each pixel, the brightness value of the R component is $I_R$, the brightness value of the G component is $I_G$ and the brightness value of the B component is $I_B$, the brightness value I of the brightness image is calculated from following equation 2.

$$I = 0.299 I_R + 0.587 I_G + 0.114 I_B \quad [2]$$

When a brightness image is outputted from camera signal processing section 4, step S1 can be omitted.

Figure 6A:
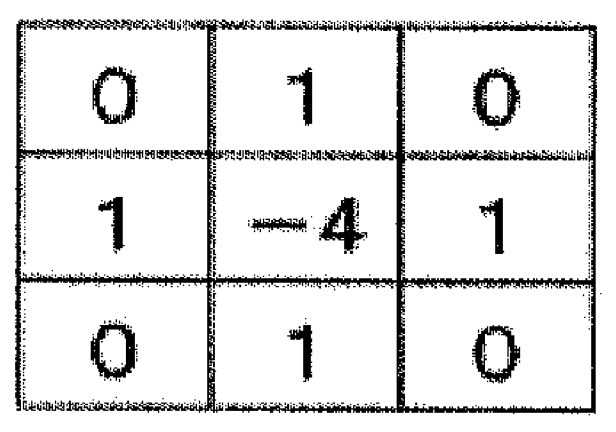
Figure 6B:
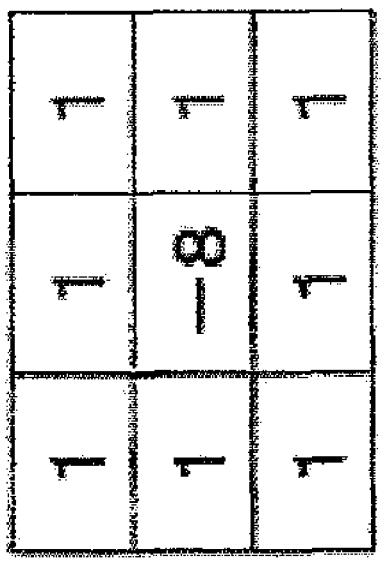
FIG. 6B illustrates another example of weighting coefficients of a 3×3 Laplacian filter used for image inclination detection of the imaging apparatus according to Embodiment 1 of the present invention.

In step S2, edge detection is performed with the brightness image created in step S1. As the edge detection method, for example, a 3×3 Laplacian filter may be applied. FIG. 6A and FIG. 6B illustrate an example of weighting coefficients of the 3×3 Laplacian filter. To determine the size of an edge component of a pixel of interest, the edge component of the pixel of interest is determined by assigning weights to pixels in the vicinity of the pixel of interest and adding up the weights, as shown in FIG. 6A or FIG. 6B. Examples of other widely-known edge extraction methods include methods using a filter such as a Sobel filter and Prewitt filter.

In step S3, line segment extraction processing is performed with the edge extracted image created in step S2. As a more specific processing method, for example, the Hough transform, which is widely used in image processing as a robust, straight line detection technique, may be used. In the Hough transform, when a straight line to be obtained on an X-Y plane is expressed by Y=pX+q using parameters p and q, a line of q=Y−pX is plotted on a per pixel (X, Y) basis on a p–q parameter space. Suppose a straight line having parameters (p, q) at a point at which many trails intersect with each other exists in the image. FIG. 5A to FIG. 5D illustrate an example where such processing is used.

Figure 5A:
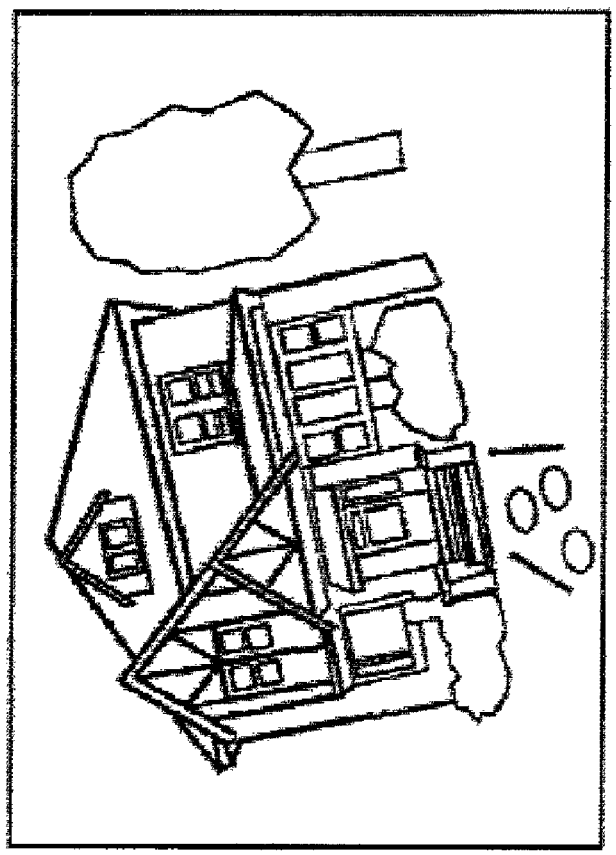
FIG. 5A illustrates a step in image inclination angle detection processing by the imaging apparatus according to Embodiment 1 of the present invention and illustrates a source image with an inclination.
Figure 5B:
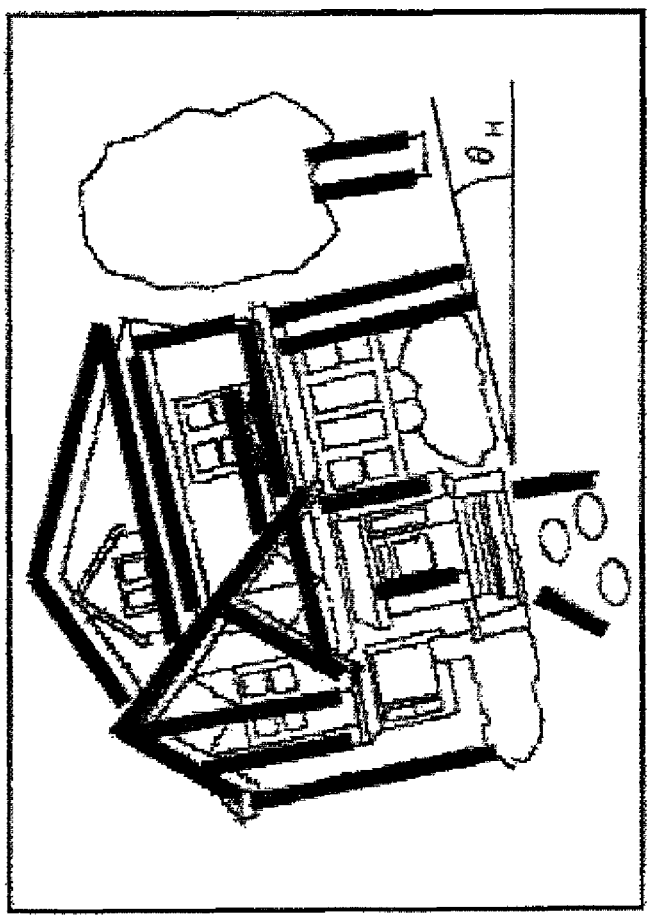
FIG. 5B illustrates a step in image inclination angle detection processing by the imaging apparatus according to Embodiment 1 of the present invention and illustrates an example of a line segment extraction result.

FIG. 5A shows an example of an image where imaging apparatus 100 has shot an image with an inclination with respect to the horizontal. FIG. 5B shows an example of a result of performing edge detection and line segment extraction for the source image in FIG. 5A. The line segments shown by thick lines are the extracted line segments. It is obvious from FIG. 5B that not all line segments are extracted.

The sensitivity of line segment extraction depends on the threshold setting when the "parameters (p, q) at a point where many lines cross" on the p–q plane in the explanation of the aforementioned Hough transform are extracted. Furthermore, as processing generally performed, after extracting line segment candidates through the Hough transform, filtering may be performed based on the lengths of line segments and magnitude of brightness in the edge-detected image. Tuning such filtering processing allows noise-robust inclination angle detection.

Figure 5C:
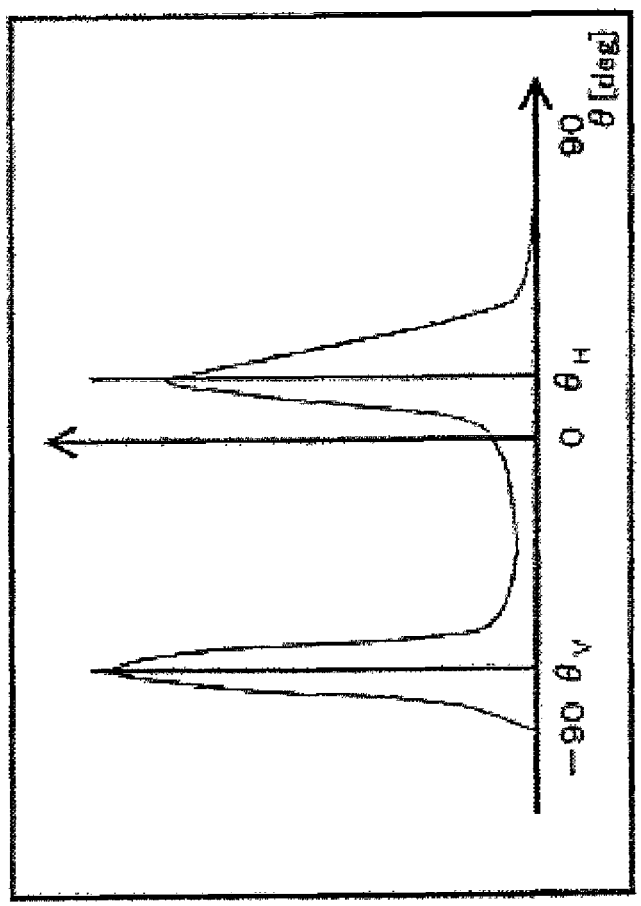
FIG. 5C illustrates a step in image inclination angle detection processing by the imaging apparatus according to Embodiment 1 of the present invention and illustrates an angle distribution of extracted line segments.
Figure 5D:
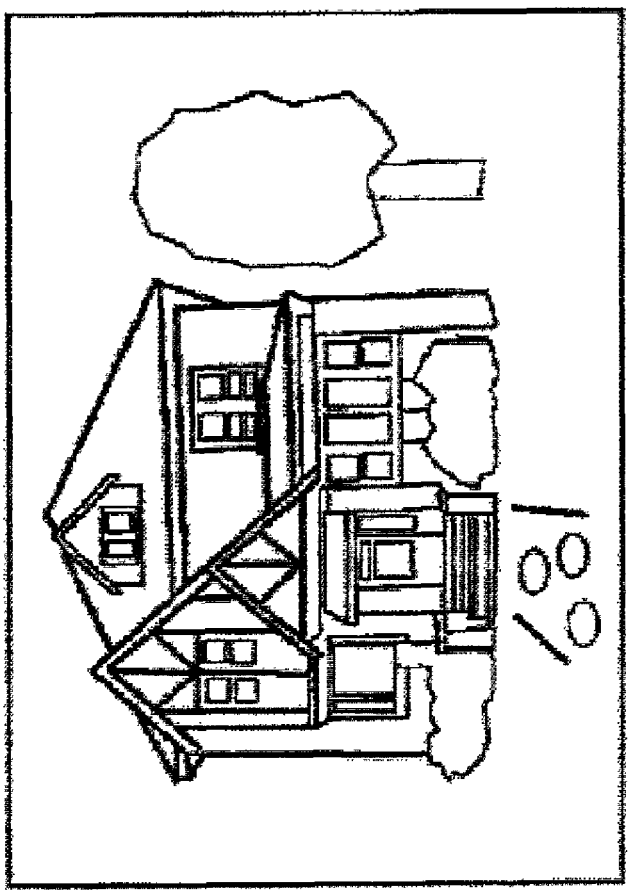
FIG. 5D illustrates a step in image inclination angle detection processing by the imaging apparatus according to Embodiment 1 of the present invention and illustrates an image after inclination correction.

In step S4, the angles of inclination of the line segments extracted in step S3 are calculated and a distribution thereof is obtained. Here, suppose the angle of inclination is 0 degrees in the horizontal direction as described above. Furthermore, the angles of inclination assume values in a range of ±90 degrees. FIG. 5C schematically shows the distribution of inclination angles θ of the extracted line segments in FIG. 5B. In FIG. 5C, line segments in the substantially horizontal direction and line segments in the substantially vertical direction of the source image form two peaks.

In step S5, these peak positions are detected and the horizontal direction and vertical direction are determined. As described above, generally, two peaks occur in the horizontal direction and vertical direction at 90-degree intervals. The two peaks are detected and angle $\theta_H$ in the horizontal direction and angle $\theta_V$ in the vertical direction of the image are obtained. To detect these angles accurately, peak detection is performed with distribution data resulting from superimposing the data within the range of −90≦θ<0 [deg] over the data within the range of 0≦θ<90 [deg] of the angle distribution shown in FIG. 5C. Thus, the accuracy of horizontal and vertical direction detection can be improved.

Finally in step S6, a final angle of inclination of the image is calculated based on the angles in the horizontal direction and vertical direction in the image detected in step S5. Here, assuming that the angle of inclination of the image is, for example, $\theta_H$, the angle of inclination of imaging apparatus 100 upon image-shooting is $-\theta_H$.

Next, operation of apparatus inclination angle calculation processing section 13 in microcomputer 14 will be explained.

Figure 7:
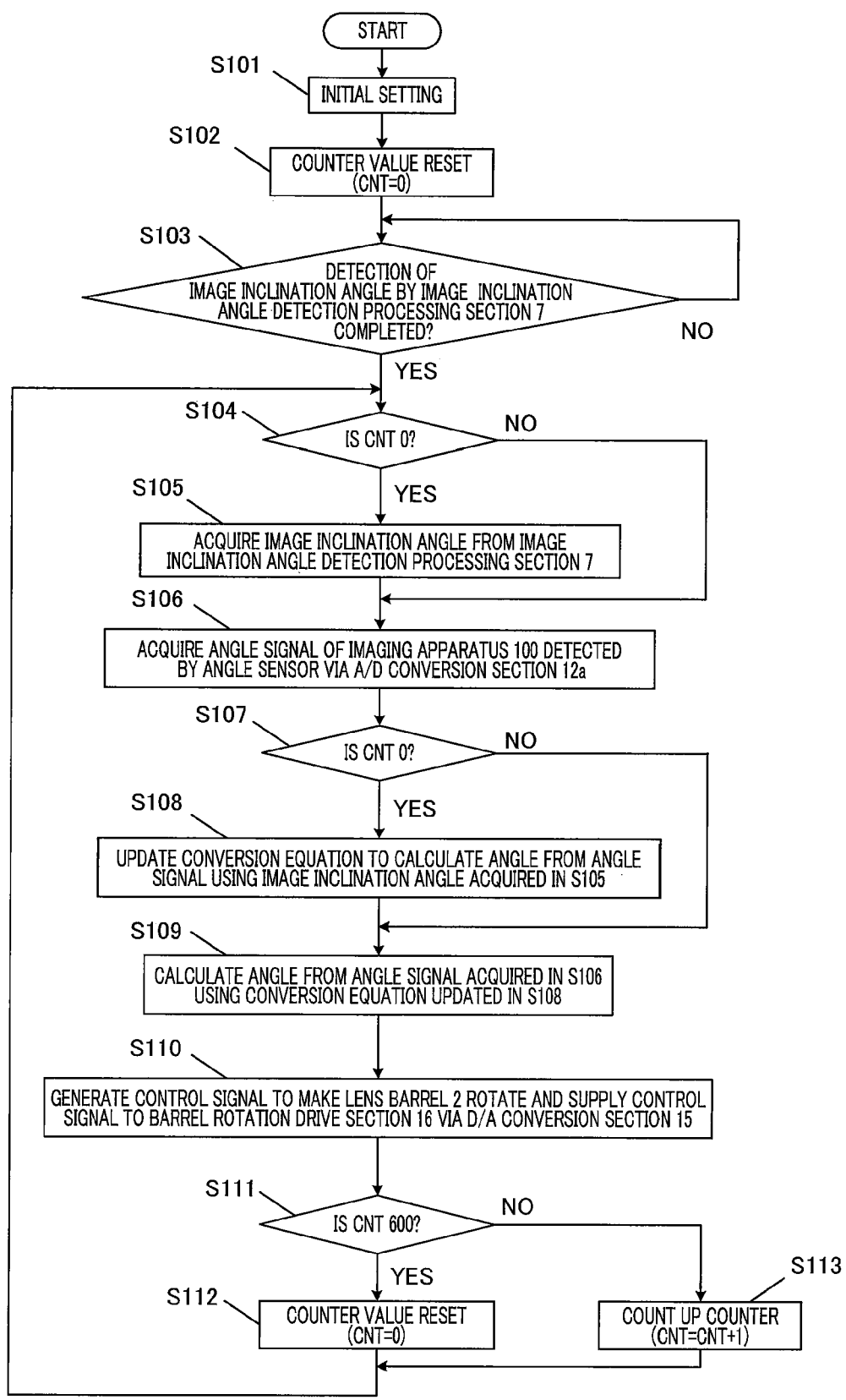
FIG. 7 is a flowchart of a processing program stored in the microcomputer of the imaging apparatus according to Embodiment 1 of the present invention.

FIG. 7 is a flowchart of a processing program stored in microcomputer 14 of imaging apparatus 100 according to Embodiment 1 of the present invention. When an inclination correction switch (not shown) is turned on, a series of processes shown in FIG. 7 is started. Though not described in FIG. 7, one processing loop is executed, for example, by giving an interruption in a certain cycle by a timer incorporated in microcomputer 14. Suppose the cycle in which such an interruption is given is the cycle in which an angle signal is acquired from angle sensor 8a (every 1/600 seconds).

First, when the inclination correction switch is turned on, in step S101, a control signal value supplied to barrel rotation drive section 16 is set to an initial value corresponding to 0 degrees via D/A conversion section 15.

Furthermore, in step S102, a counter (hereinafter, abbreviated as "CNT") installed in microcomputer 14 is set to 0 (counter reset). Furthermore, in step S103, it stands by until image inclination angle detection processing section 7 completes the detection of the angle of inclination from the first image.

When the detection of the angle of inclination from the first image is completed in image inclination angle detection processing section 7 and an interruption is given by the timer, the process is branched to step S105 or step S106 according to the CNT value in step S104. When the CNT value is 0, in step S105, the angle of inclination of the image is acquired from image inclination angle detection processing section 7. When the CNT value is not 0, the step moves to step S106 and an angle signal is acquired from angle sensor 8a via A/D conversion section 12a.

Next, in step S107, the process is branched to step S108 or step S109 according to the CNT value again. When the CNT value is 0, in step S108, a conversion equation (described later), is updated using the angle of inclination of the image acquired in step S105. When the CNT value is not 0, in step S109, the inclination of imaging apparatus 100 is calculated using a conversion equation (described later), from the angle signal acquired in step S106.

In step S110, a control signal value for rotating lens barrel 2 in a direction in which the inclination of the shot image caused by the inclination of imaging apparatus 100 calculated in step S109 is calculated, and this control signal value is supplied to barrel rotation drive section 16 via D/A conversion section 15.

In step S111, the CNT value is compared with the number of times to read angle signals from angle sensor 8a per second, 600, and, if the CNT value is 600, the CNT is reset (step S112), and, if the CNT value is not 600, the CNT is counted up by one.

The operation of the apparatus according to Embodiment 1 configured as shown above will be explained based on a processing program stored in microcomputer 14.

When the inclination correction is set in an operating state by a command or the like of the operator of imaging apparatus 100, the series of processes shown in FIG. 7 is started.

First, image inclination angle detection processing section 7 starts to detect the angle of inclination of the image from the shot image. Angle sensor 8a also starts to detect an inclination of imaging apparatus 100 substantially at the same time. The CNT value is 0 in an initial state (step S102), and in step S103, the standby continues until image inclination angle detection processing section 7 finishes detecting the angle of inclination of the image. Examples of the method for knowing that image inclination angle detection processing section 7 has finished detecting the angle of inclination of the image includes a method of assigning weights through timer processing for a certain time and a method whereby image inclination angle detection processing section 7 reports completion of the processing to microcomputer 14 by means of an interruption or communication or the like, but the method is not particularly limited in Embodiment 1.

When image inclination angle detection processing section 7 completes the detection of the angle of inclination of the image, the CNT value is checked in step S104. Since the CNT value is 0 at first, in step S105, the angle of inclination of the image detected in image inclination angle detection processing section 7 is acquired.

Next, in step S106, the angle signal from angle sensor 8a is acquired via A/D conversion section 12a.

Next, in step S107, since the CNT value is 0, the step moves to step S108 and the conversion equation for converting the angle signal acquired in step S105 to an angle is updated. Here, the updating of the conversion equation for converting the angle signal to an angle will be explained using FIG. 8.

First, the conversion equation is an equation as shown in equation 1, but this only gives the initial value of the conversion equation. The reason is that angle sensor 8a is a physical sensor that detects, for example, the direction or magnitude of acceleration of gravity and the characteristics thereof generally vary per individual part and have temperature characteristics. Unless processing such as individually adjusting the characteristics of angle sensor 8a is performed, the characteristics vary every angle sensor 8a. Thus, the value of the angle obtained from the angle signal value through the conversion equation is not always correct. Furthermore, even if angle sensor 8a is individually adjusted, there is still no guarantee that the value of the angle obtained is correct due to aging or temperature variations. On the other hand, the value of the angle of inclination of the image obtained from image inclination angle detection processing section 7 is not affected by any individual variations, aging or temperature variations.

Figure 9:
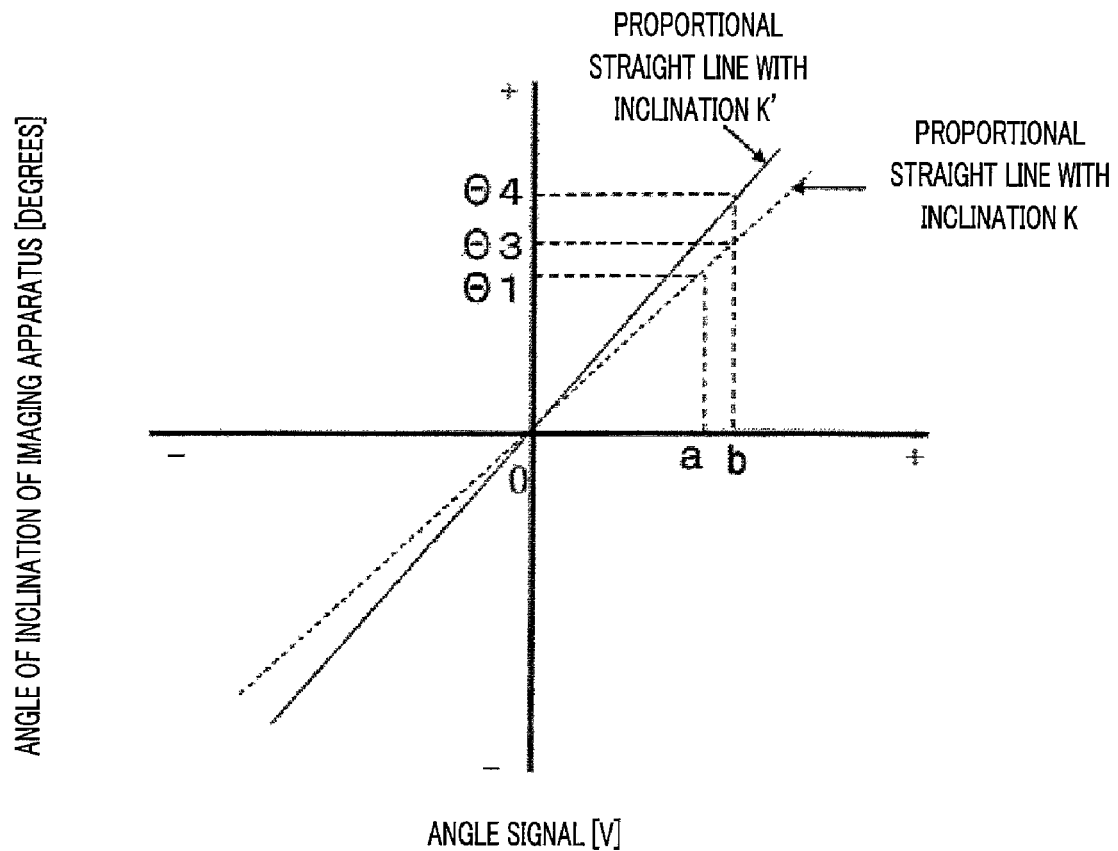
FIG. 9 illustrates a method of updating a conversion equation for converting an angle signal of the imaging apparatus to an angle according to Embodiment 1 of the present invention.

Thus, in step S108, the conversion equation is updated (calibrated) using the value of the angle of inclination of the image obtained from image inclination angle detection processing section 7. As shown in FIG. 9, assuming that the angle of inclination of the image acquired in step S105 is θ2 and the angle signal acquired in step S106 is b, if the angle signal is b, the angle of the conversion result is θ3 according to the conversion equation in an initial state shown in FIG. 8 and equation 1. If the angle of inclination of imaging apparatus 100 has been correctly detected according to the angle signal and lens barrel 2 has rotated in accordance with this angle of inclination, the inclination of the shot image is 0 degrees. That is, since the shot image is shot with its horizontality retained, θ2 becomes 0. However, when the value of the angle obtained from the angle signal value according to the conversion equation is not correct, the shot image has been shot in an inclined state, and therefore θ2 has some value. The value of θ2 can be said to correspond to an error of the value of the angle obtained from the angle signal value according to the conversion equation. Therefore, the value obtained by subtracting θ2, which is an error, from θ3 is the correct angle of imaging apparatus 100. Thus, the value obtained by subtracting θ2 from θ3 is compared with θ3, and, if both are equal, the updating of the conversion equation is judged unnecessary. By contrast, if the value obtained by subtracting θ2 from θ3 is different from θ3, the value obtained by subtracting θ2 from θ3 is newly assumed to be θ4 and the inclination of the conversion equation is calculated using following equation 3 again.

$$\text{Inclination}(K') = \theta4/b \quad [3]$$

Using this K', the conversion equation is updated as shown in equation 4 below.

$$\text{Angle} = K' \times \text{angle signal} \quad [4]$$

Next, in step S109, the angle of inclination of imaging apparatus 100 is calculated from the angle signal acquired in step S106 using conversion equation 4 updated in step S108. In step S110, the rotation of lens barrel 2 is driven, a control signal for removing the inclination of the shot image is generated, and the control signal is supplied to barrel rotation drive section 16 via D/A conversion section 15. When lens barrel 2 is rotated based on this control signal, the inclination of the shot image caused by the inclination of imaging apparatus 100 is thereby corrected.

Step S111, step S112 and step S113 are steps of resetting or counting up the CNT value, and, when the CNT value is 600, the CNT value is reset to 0, and, when the CNT value is less than 600, the CNT value is counted up by 1.

When such a series of processes is completed, for example, an interruption is given by the timer incorporated in microcomputer 14 in a certain cycle, and the loop processing in and after step S104 is repeated.

Since the CNT value is not 0 from the second loop on, step S105 and step S108 are not executed and the angle of inclination of imaging apparatus 100 is calculated according to the conversion equation updated in step S108 based on the angle signal acquired in step S106. In step S110, a control signal is generated to drive the rotation of lens barrel 2 and remove the inclination of the shot image. When lens barrel 2 rotates as described above, the inclination of the shot image caused by the inclination of imaging apparatus 100 is corrected.

These loops are repeated, the CNT value becomes 600 and the CNT is reset to 0 in step S112, and in the next loop, the conversion equation is updated (calibrated) using the angle of inclination value of the image obtained from image inclination angle detection processing section 7 again.

Thus, the conversion equation is updated (calibrated) in a certain cycle using the value of the angle of inclination of the image obtained from image inclination angle detection processing section 7. By this means, even if the characteristics vary between individual angle sensors 8a, or, furthermore, the characteristics vary due to aging and temperature variations, the conversion equation for calculating the angle from the angle signal is constantly updated. Therefore, it is possible to realize accurate angle detection and correction of the inclination of imaging apparatus 100.

As described so far, according to Embodiment 1, microcomputer 14 calibrates an angle signal of imaging apparatus 100 obtained from angle sensor 8a in a certain cycle using an angle of inclination of a shot image detected in image inclination angle detection processing section 7. In this way, even if the characteristics vary between individual angle sensors 8a, or, furthermore, the characteristics change due to aging and temperature variations, accurate angle detection is possible. Furthermore, correcting the inclination of imaging apparatus 100 using this detected angle of inclination makes it possible to realize accurate inclination correction.

Embodiment 2

A configuration has been explained in Embodiment 1 of the present invention whereby the rotation of lens barrel 2 is driven to correct the inclination of a shot image caused by an inclination of imaging apparatus 100, but such a configuration may also be considered that an inclination of a shot image is corrected by rotating imaging element 3 instead of lens barrel 2. Embodiment 2 is designed to correct an inclination of a shot image by rotating imaging element 3.

Figure 10:
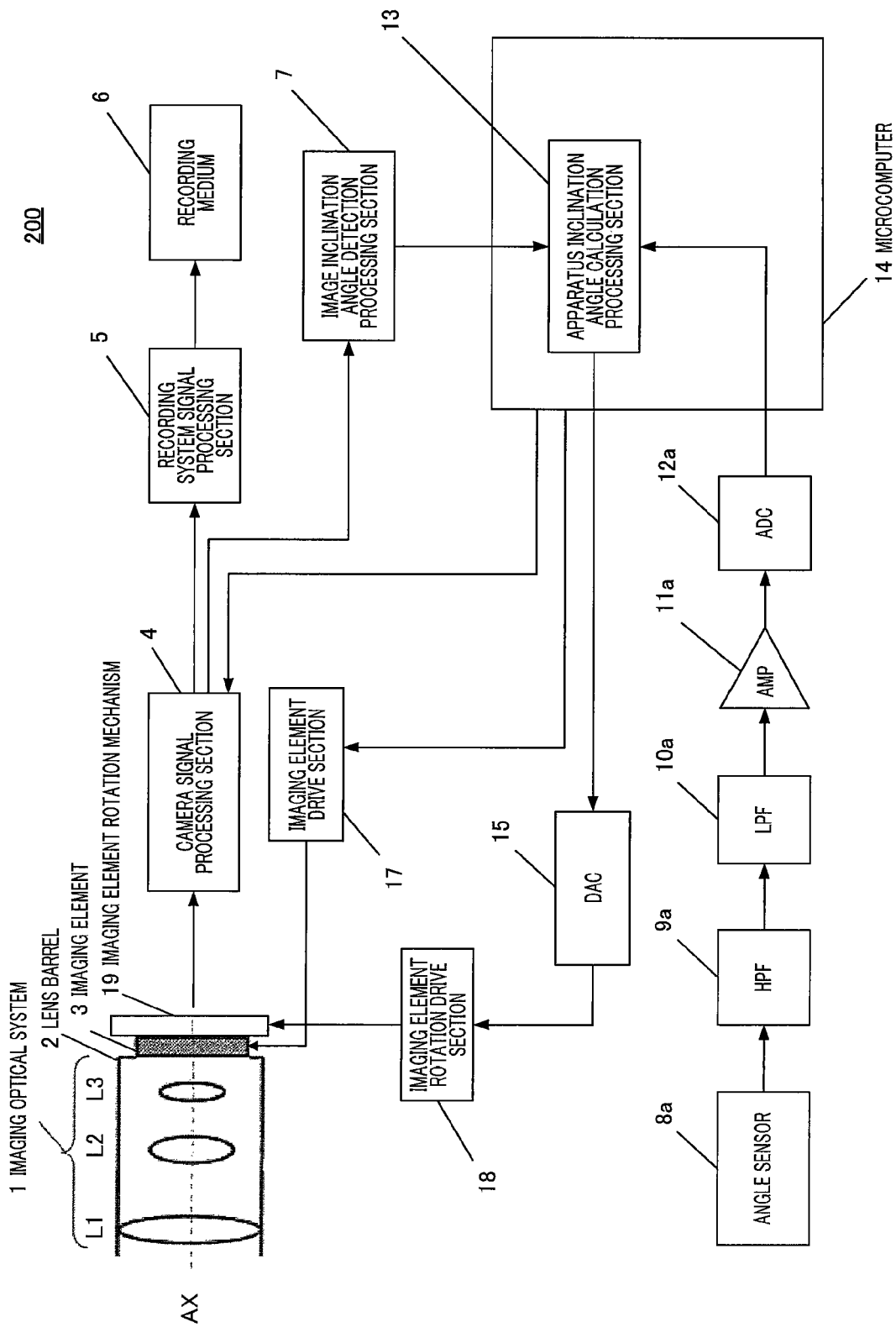
FIG. 10 is a block diagram illustrating a configuration of an imaging apparatus according to Embodiment 2 of the present invention.
Figure 11:
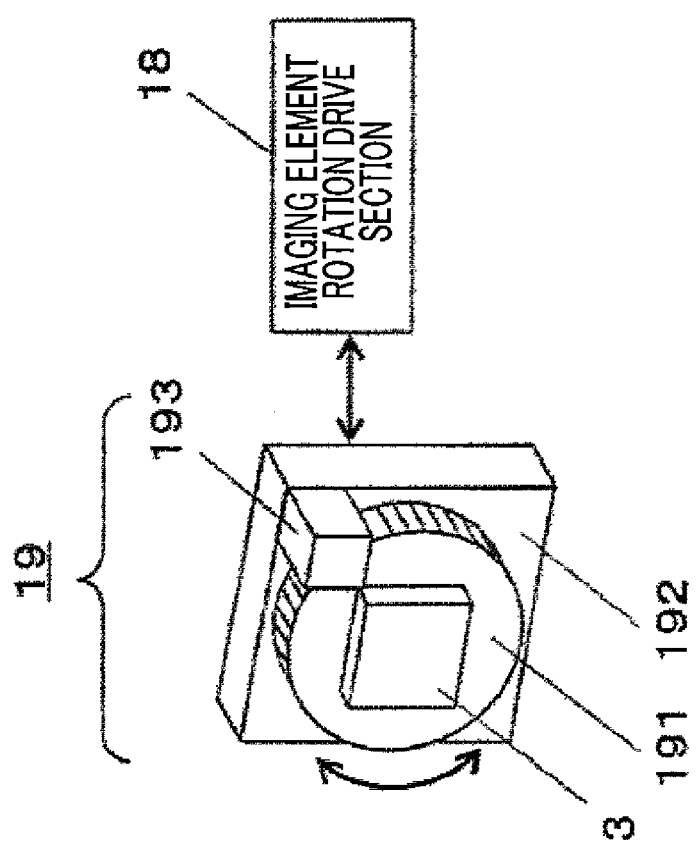
FIG. 11 is a perspective view illustrating a schematic configuration of the imaging element rotation mechanism of the imaging apparatus according to Embodiment 2 of the present invention.

FIG. 10 is a block diagram illustrating a configuration of imaging apparatus 200 according to Embodiment 2 of the present invention. Parts similar to those in Embodiment 1 are assigned the same reference numerals, explanations thereof will be omitted and only differences will be explained. In FIG. 10, imaging element rotation mechanism 19 provides a mechanism for rotating imaging element 3 about the optical axis of imaging optical system 1. As with barrel rotation drive section 16 of Embodiment 1 of the present invention, imaging element rotation drive section 18 is designed to drive the rotation of imaging element rotation mechanism 19 and this causes imaging element rotation mechanism 19 to rotate, and as a result, imaging element 3 rotates, thus correcting the inclination of the image upon image-shooting. FIG. 11 illustrates a schematic configuration of imaging element rotation mechanism 19.

In FIG. 11, imaging element rotation mechanism 19 has turntable 191, fixed frame 192 and drive source 193. Imaging element 3 is fixed to turntable 191 and turntable 191 is rotatably set up on fixed frame 192. Furthermore, drive source 193 fixed to fixed frame 192 has an actuator such as a DC motor (not shown) and a gear box that transmits the rotation drive force thereof to turntable 191.

Imaging element rotation drive section 18 receives a rotation control signal from microcomputer 14 via D/A conversion section 15, converts the control signal to a signal that can control an actuator included in drive source 193 and outputs the converted signal. Upon receiving this signal, drive source 193 generates drive force according to the command and drives the rotation of turntable 191 and imaging element 3. The amounts of rotation motion of turntable 191 and imaging element 3 are detected by a position detector (not shown) fixed to fixed frame 192. The position detector has a configuration with a magnetic sensor provided on fixed frame 192. The magnetic sensor reads the intensity of a magnetic field created by, for example, a slit-shaped magnetic pattern described in the inner circumference of turntable 191. The output of such a position detector is returned to imaging element rotation drive section 18 and the position is detected by counting the number of pulses. By forming a feedback control loop using this information, it is possible to position imaging element 3 accurately.

In Embodiment 2 configured as shown above, imaging element 3 is rotated by a control signal supplied from microcomputer 14 via D/A conversion section 15 as with Embodiment 1 and the inclination of the shot image caused by the inclination of imaging apparatus 200 is corrected.

Furthermore, as with Embodiment 1, the angle signal of imaging apparatus 200 obtained from angle sensor 8a in a certain cycle is calibrated using the angle of inclination of the shot image detected in image inclination angle detection processing section 7. By this means, even if the characteristics vary between individual angle sensors 8a, or, furthermore, the characteristics change due to aging or temperature variations, it is possible to realize accurate angle detection and correction of the inclination of imaging apparatus 200.

Embodiment 3

Figure 12:
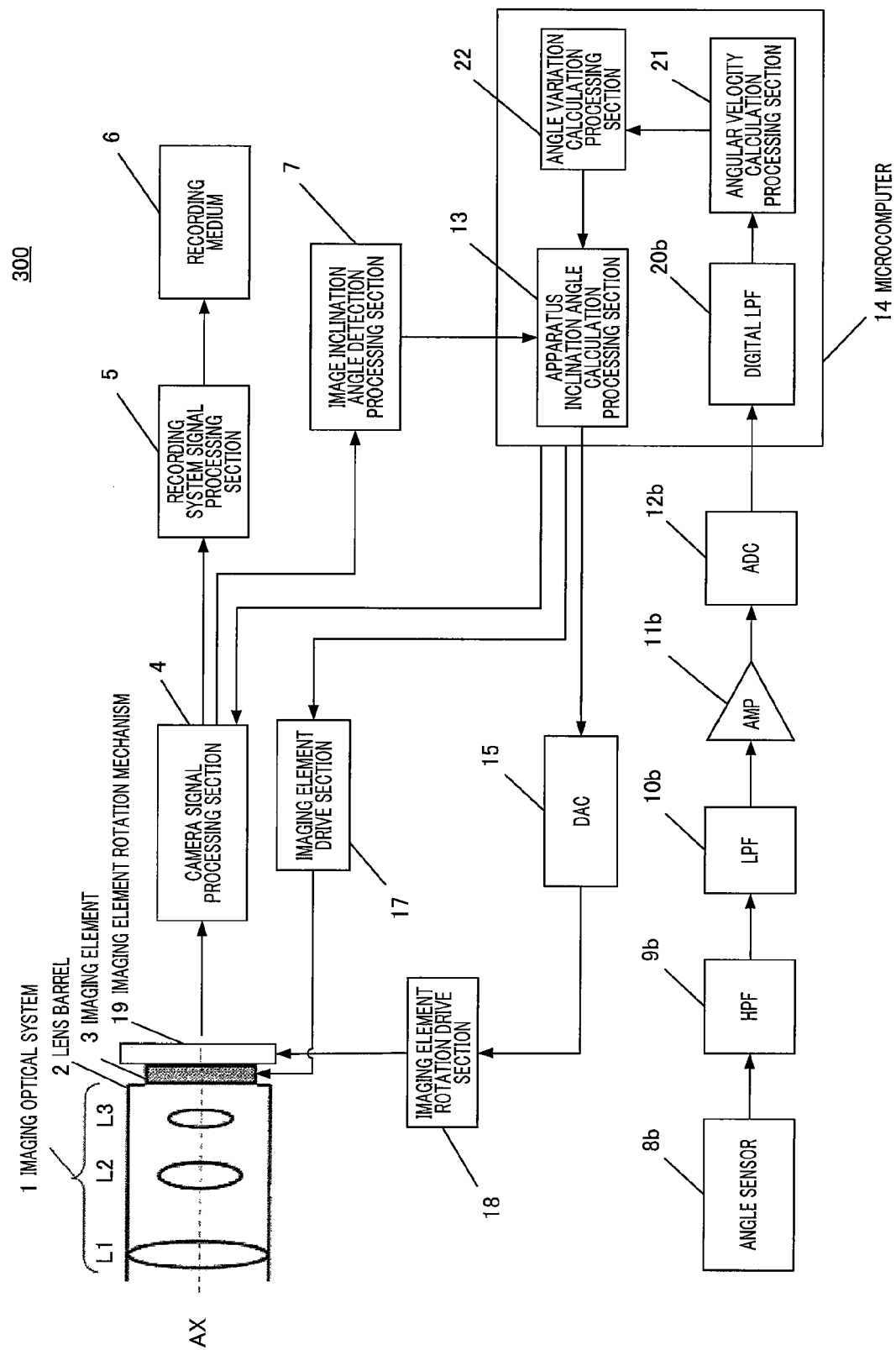
FIG. 12 is a block diagram illustrating a configuration of an imaging apparatus according to Embodiment 3 of the present invention.
Figure 13:
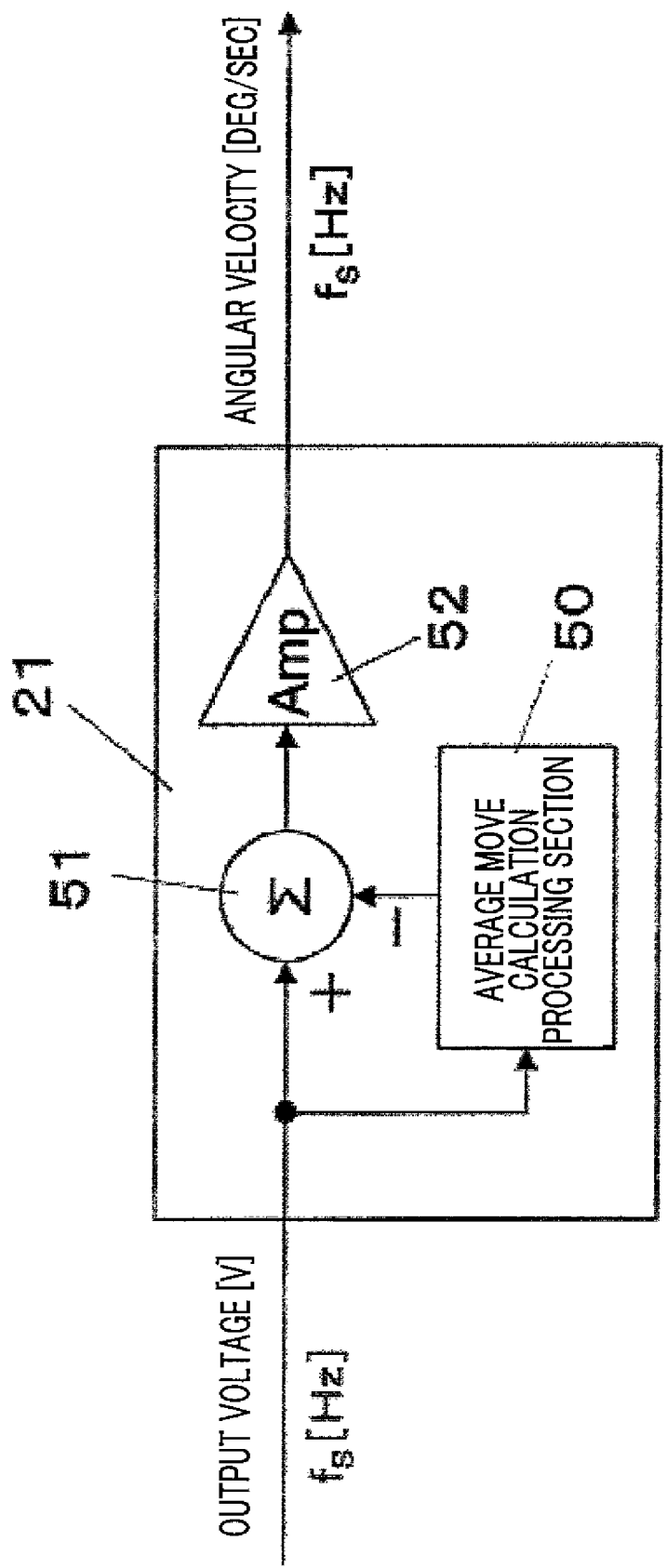
FIG. 13 is a block diagram showing angular velocity calculation processing by the imaging apparatus according to Embodiment 3 of the present invention.
Figure 14:
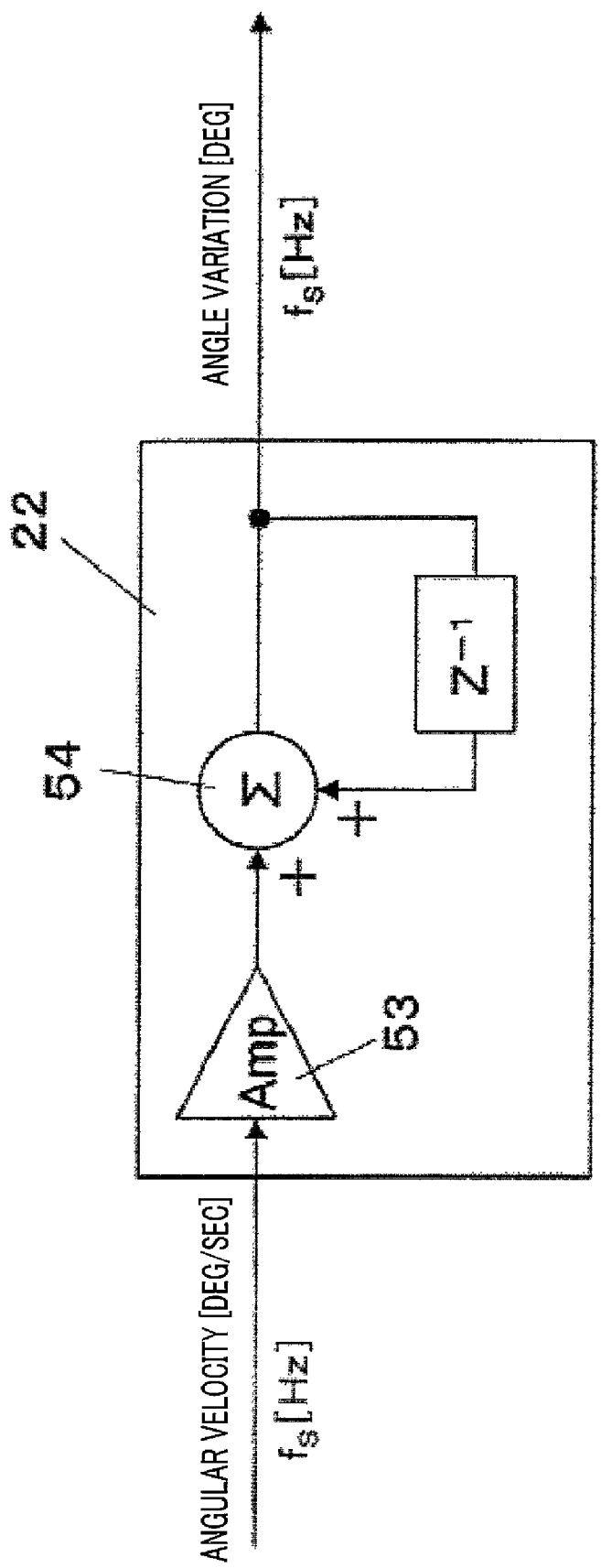
FIG. 14 is a block diagram showing the angle variation calculation processing by the imaging apparatus according to Embodiment 3 of the present invention.
Figure 15:
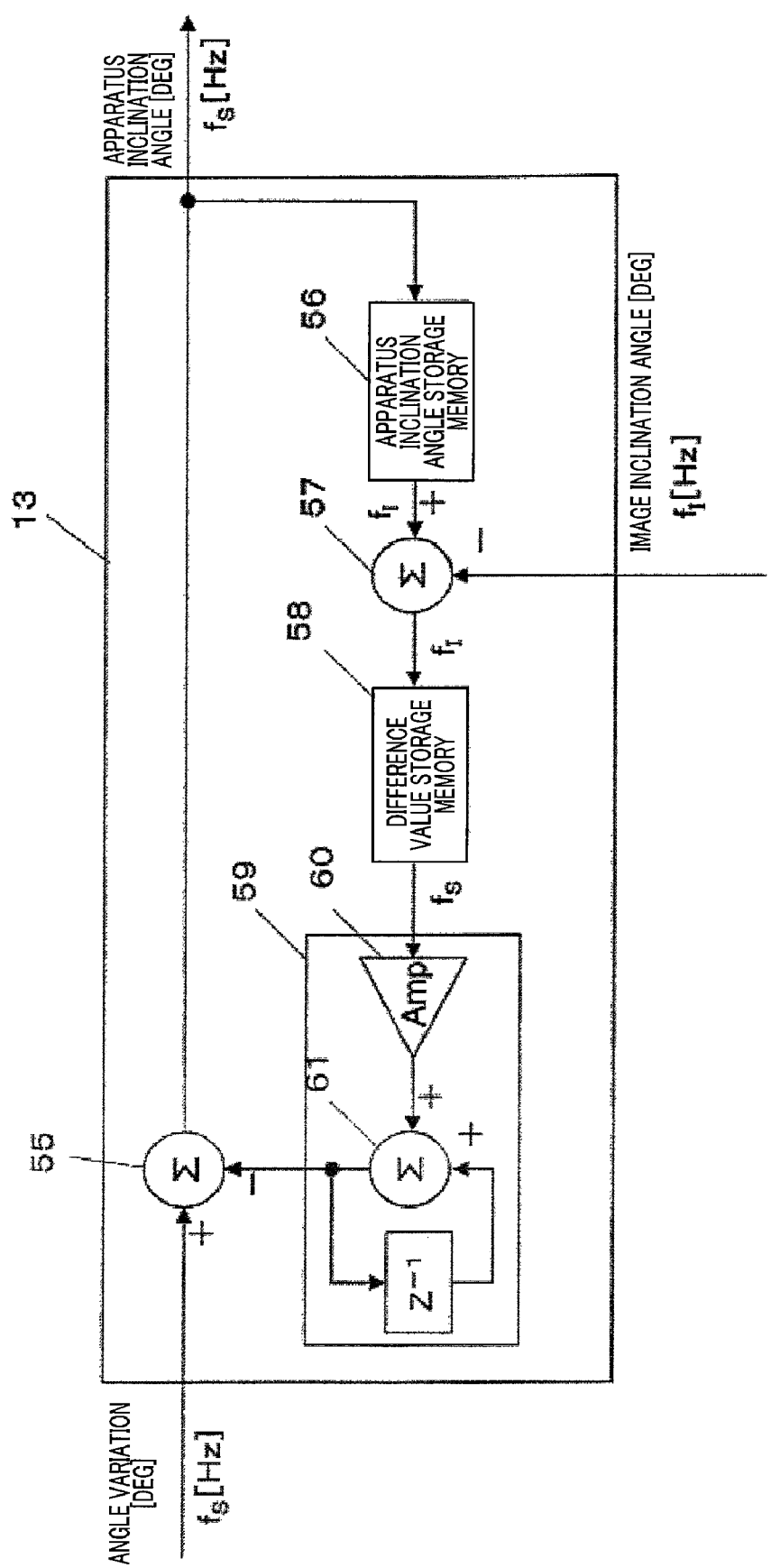
FIG. 15 is a block diagram showing the apparatus inclination angle calculation processing by the imaging apparatus according to Embodiment 3 of the present invention.
Figure 16:
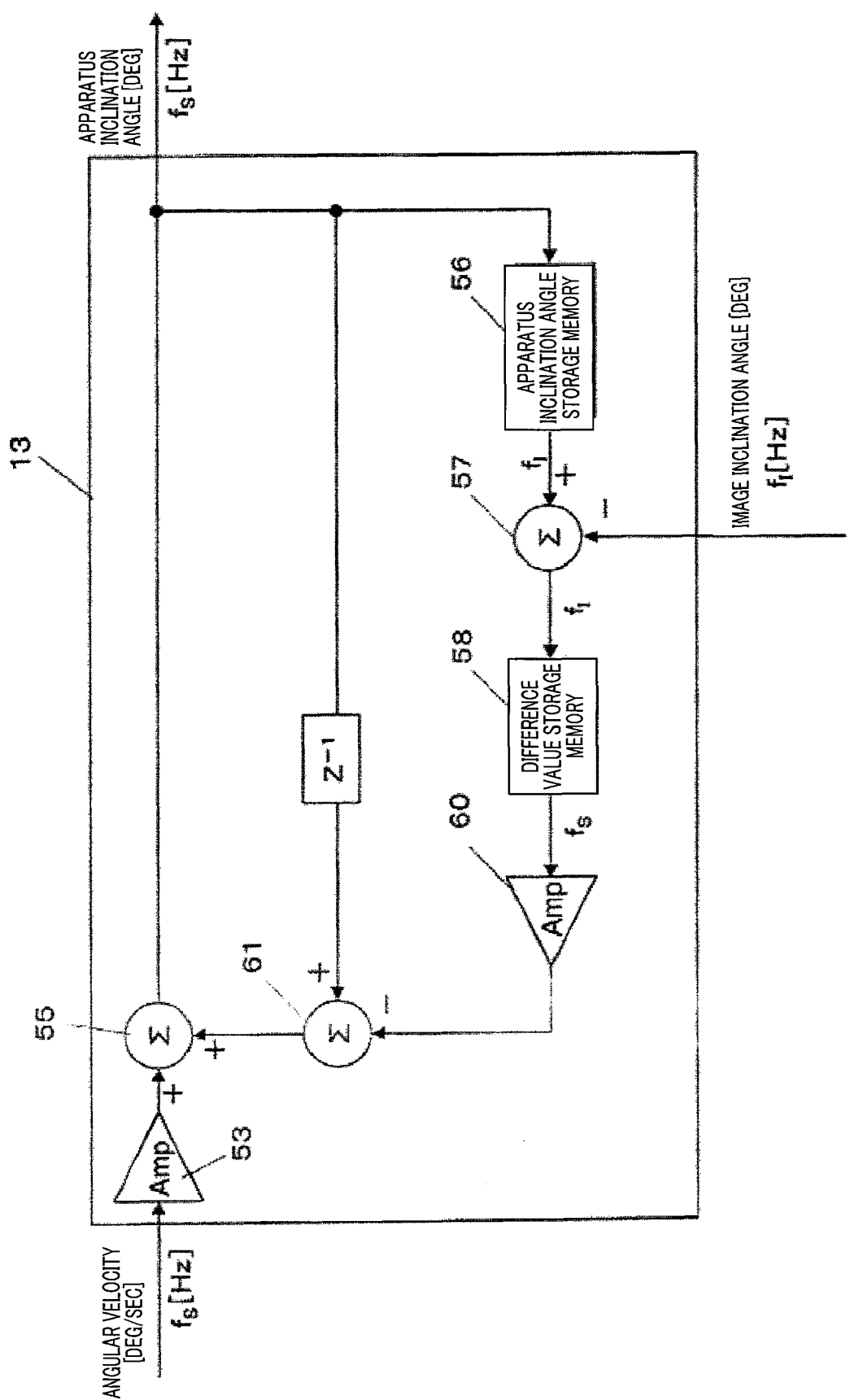
FIG. 16 is a block diagram showing the apparatus inclination angle calculation processing by the imaging apparatus according to Embodiment 3 of the present invention.

Hereinafter, imaging apparatus 300 according to Embodiment 3 of the present invention will be explained using FIG. 12 to FIG. 16. FIG. 12 is a block diagram illustrating a configuration of imaging apparatus 300 according to Embodiment 3 of the present invention, FIG. 13 is a block diagram showing angular velocity calculation processing, FIG. 14 is a block diagram showing angle variation calculation processing, and FIGS. 15 and 16 are block diagrams of apparatus inclination angle calculation processing. Furthermore, in order to distinguish the apparatus inclination angle calculated from the image inclination angle, from the apparatus inclination angle obtained using an inclination sensor, Embodiment 3 expresses the former as $\alpha_I$ and refers to it as the "image inclination angle" and expresses the latter as $\alpha_S$ and refers to it as the "apparatus inclination angle."

The configuration of imaging apparatus 300 according to Embodiment 3 will be explained using FIG. 12. A difference of Embodiment 3 from Embodiment 1 and Embodiment 2 is that Embodiment 3 uses an angular velocity sensor as an inclination sensor of imaging apparatus 300 instead of the angle sensor. The rest of the configuration is the same as that of Embodiment 1 and Embodiment 2, and therefore similar parts are assigned the same reference numerals and explanations thereof will be omitted.

Angular velocity sensor 8b is a so-called gyro sensor fixed at an arbitrary position of imaging apparatus 300 so as to detect the angular velocity in the rolling direction with respect to the subject. As the output of the gyro sensor, it is possible to select between analog output and digital output. Here, a case where the analog voltage output is selected is assumed. The voltage signal outputted from angular velocity sensor 8b is sent to HPF 9b, LPF 10b, amplifier 11b, A/D conversion section 12b, digital LPF 20b and angular velocity calculation processing section 21 in sequence and processed. Digital LPF 20b is subjected to lowpass filtering processing to mainly cancel high frequency noise on an as-needed basis. Angular velocity calculation processing section 21 converts a voltage value to angular velocity (described later), and angle variation calculation processing section 22 converts the angular velocity to an angle variation (described later).

Apparatus inclination angle calculation processing section 13 corrects the angle variation outputted from angle variation calculation processing section 22 using the angle of inclination outputted from image inclination angle detection processing section 7 and calculates the angle of inclination of imaging apparatus 300. The detailed operation thereof will be described later.

Digital LPF 20b, angular velocity calculation processing section 21, angle variation calculation processing section 22 and apparatus inclination angle calculation processing section 13, which are digital processing, are implemented inside microcomputer 14. Furthermore, microcomputer 14 controls the operation such as the shooting timing of imaging element 3 via imaging element drive section 17.

Next, the processing executed by angular velocity calculation processing section 21 will be explained using FIG. 13.

As has already been explained, the analog voltage output of angular velocity sensor 8b is subjected to pre-processing such as band restriction, noise cancellation and A/D conversion through HPF 9b, LPF 10b, amplifier 11b, A/D conversion section 12b and digital LPF 20b, and converted to a voltage signal $V(n \cdot Ts)[V]$ digitized at the sampling frequency $f_S[Hz]$ of A/D conversion section 12b. Here, Ts is a sampling cycle [sec] and n is an integer. Angular velocity calculation processing section 21 receives this digitized voltage signal as input. By contrast, the calculation shown in equation 5 is carried out, and an angular velocity $\omega(n \cdot Ts)$ [deg/sec] is outputted.

$$\omega(n \cdot Ts) = \left\{ V(n \cdot Ts) - \sum_{k=n-N}^{n} V(k \cdot Ts)/N \right\} / S \quad [5]$$

N: Number of samples of average move

A block diagram for realizing equation 5 is shown in FIG. 13 and this will be explained. Inside angular velocity calculation processing section 21, an input signal is branched first, one is inputted to adder 51 and the other is inputted to average move calculation processing section 50. Average move calculation processing section 50 calculates an average of several tens of recent voltage values (referred to as "average move voltage values") and outputs the average to adder 51. The average move voltage value becomes the reference voltage when the angular acceleration is 0. Adder 51 subtracts the average move voltage value from the latest voltage value and outputs the difference voltage value. Multiplier 52 carries out a division by a sensitivity constant S[V/deg/sec] set up in advance. This causes the difference voltage value to be converted to an angular velocity $\omega(n \cdot Ts)$ [deg/sec].

Next, the processing executed by angle variation calculation processing section 22 will be explained. Angle variation calculation processing section 22 integrates the angular velocity $\omega(n \cdot Ts)$ [deg/sec] and outputs an angle variation $\phi(n \cdot Ts)$ [deg]. To be more specific, as shown in FIG. 14, multiplier 53 multiplies the angular velocity $\omega(n \cdot Ts)$ [deg/sec] by a sampling cycle Ts[sec] of A/D conversion section 12b first. Next, adder 54 performs integration processing.

Next, the processing executed by apparatus inclination angle calculation processing section 13 will be explained. Apparatus inclination angle calculation processing section 13 receives the angle variation $\phi(n \cdot Ts)$ [deg] from angle variation calculation processing section 22 and the image inclination angle $\alpha_I(m \cdot Ti)$ [deg] from image inclination angle detection processing section 7 as input. Here, Ti is a sampling cycle [sec] of the image inclination angle $\alpha_I$ and m is an integer. With reference to the image inclination angle $\alpha_I(m \cdot Ti)$ [deg], the absolute value of the angle variation $\phi(n \cdot Ts)$ [deg] is corrected. To be more specific, as shown in FIG. 15, adder 55 subtracts a correction value $C(n \cdot Ts)$ [deg] which is the input value from correction value calculation processing section 59 from the angle variation $\phi(n \cdot Ts)$ [deg]. In this way, the angle of inclination $\alpha_S(n \cdot Ts)$ [deg] of imaging apparatus 300 is obtained. The apparatus inclination angle $\alpha_S(n \cdot Ts)$ [deg] is outputted from apparatus inclination angle calculation processing section 13, and on the other hand, is sent to apparatus inclination angle storage memory 56. The value stored in apparatus inclination angle storage memory 56 is sent to adder 57. Adder 57 subtracts the image inclination angle $\alpha_I(m \cdot Ti)$ [deg], which is the input value from image inclination angle detection processing section 7, from the apparatus inclination angle $\alpha_S(n \cdot Ts)$ [deg].

This difference value $(\alpha_S(n \cdot Ts) - \alpha_I(m \cdot Ti))$ [deg] is assigned to difference value storage memory 58. Correction value calculation processing section 59 changes the correction value $C(n \cdot Ts)$ [deg] so that the difference value becomes 0 and thereby performs feedback to the apparatus inclination angle $\alpha_S(n \cdot Ts)$ [deg]. When this difference value is calculated, the sampling timing of the apparatus inclination angle $\alpha_S(n \cdot Ts)$ [deg] needs to be synchronized with the sampling timing of the image inclination angle $\alpha_I(m \cdot Ti)$ [deg]. Thus, the updating of apparatus inclination angle storage memory 56, subtraction processing by adder 57 and updating of difference value storage memory 58 are performed in synchronization with a processing cycle $f_I$[Hz] of image inclination angle detection processing section 7 under the timing management by microcomputer 14. That is, microcomputer 14 receives the timing of processing result output (updating of image inclination angle) from image inclination angle detection processing section 7 and commands apparatus inclination angle calculation processing section 13 on the updating processing of difference value storage memory 58. Here, the "updating processing" of difference value storage memory 58 refers to the series of processes performed by adder 57 to perform subtraction processing between the apparatus inclination angle received from apparatus inclination angle storage memory 56 and the image inclination angle received from image inclination angle detection processing section 7, and assign the result to difference value storage memory 58.

Microcomputer 14 then specifies exposure end timing in imaging element 3 of an image signal to be sent to image inclination angle detection processing section 7 to apparatus inclination angle storage memory 56 through wire connections (not shown). Upon receiving a timing command from microcomputer 14, apparatus inclination angle storage memory 56 updates the value of the apparatus inclination angle $\alpha_S(n \cdot Ts)$ [deg] stored. Furthermore, microcomputer 14 performs control such that the result of processing the image signal received as input at this exposure end timing in camera signal processing section 4, is next sent to image inclination angle detection processing section 7.

Here, the exposure end timing is supposed to be sent, but there will be no practical problem even if one of the exposure start timing and timing between the exposure start and end is sent. This is because unlike camera shake correction, inclination correction assumes motion at a relatively low frequency on the order of several Hz as the correction target.

Correction value calculation processing section 59 updates the correction value C(n·Ts) [deg]. In this case, in order to avoid a drastic variation of the correction value C(n·Ts) [deg], correction value calculation processing section 59 is configured to divide the difference value ($\alpha_S$(n·Ts)–$\alpha_f$(m·Ti)) [deg] received from difference value storage memory 58 and add the divided values to the correction value C(n·Ts) [deg]. To be more specific, multiplier 60 multiplies the difference value ($\alpha_S$(n·Ts)–$\alpha_f$(m·Ti)) [deg] received from difference value storage memory 58 by ($f_f/f_S$). Adder 61 performs integration processing with the output value of multiplier 60.

Next, imaging element rotation drive section 18 drives the rotation of imaging element 3 about the optical axis of imaging element 3 by –$\alpha_S$(n·Ts) [deg] according to the apparatus inclination angle $\alpha_S$(n·Ts) [deg] received from apparatus inclination angle calculation processing section 13 so as to retain the horizontality of the shot image.

According to the above described embodiment, using angular velocity sensor (gyro sensor) 8b makes it possible to acquire the angular velocity without being affected by acceleration other than acceleration of gravity at the time of postural change of the imaging apparatus (such as panning). Furthermore, when angular velocity sensor 8b is used, although an angle variation can be easily calculated from the angular velocity through an integral calculation, there is a problem that the angle of inclination, that is, the absolute angle of inclination from is the horizontal, cannot be known. This problem can be solved by using an image inclination angle detecting section capable of outputting the angle of inclination in combination, thus making it possible to calculate the angle of inclination.

Furthermore, using the image inclination angle detecting section free of temperature characteristics/aging to correct the angle of inclination makes it possible to acquire the accurate angle of inclination without influences of the temperature characteristic/aging of the angular velocity sensor (gyro sensor).

Furthermore, the present embodiment has angular velocity calculation processing section 21 and angle variation calculation processing section 22 as separate sections, but a mode may be adopted in which both sections are merged as shown in FIG. 16. FIG. 16 shows a case where the wire connections in FIG. 15 are partly changed, and explanations thereof will be omitted.

Embodiment 4

Hereinafter, imaging apparatus 400 according to Embodiment 4 of the present invention will be explained using FIG. 17 to FIG. 20. As with Embodiment 3, imaging apparatus 400 according to Embodiment 4 has a feature of being able to stably retain the horizontality of a shot image without being influenced by variations in the position of the imaging apparatus and temperature variations/aging (during panning, for example). Furthermore, even if many line segments that may cause erroneous detection in the horizontal/vertical direction are included in a shot image, imaging apparatus 400 has a feature of being able to stably retain the horizontality of a shot image.

The main configuration of imaging apparatus 400 according to Embodiment 4 is the same as the configuration of Embodiment 3. What makes a difference is that imaging apparatus 400 is provided with an acceleration sensor for improving the accuracy of image inclination angle detection processing using an output value thereof.

Figure 17:
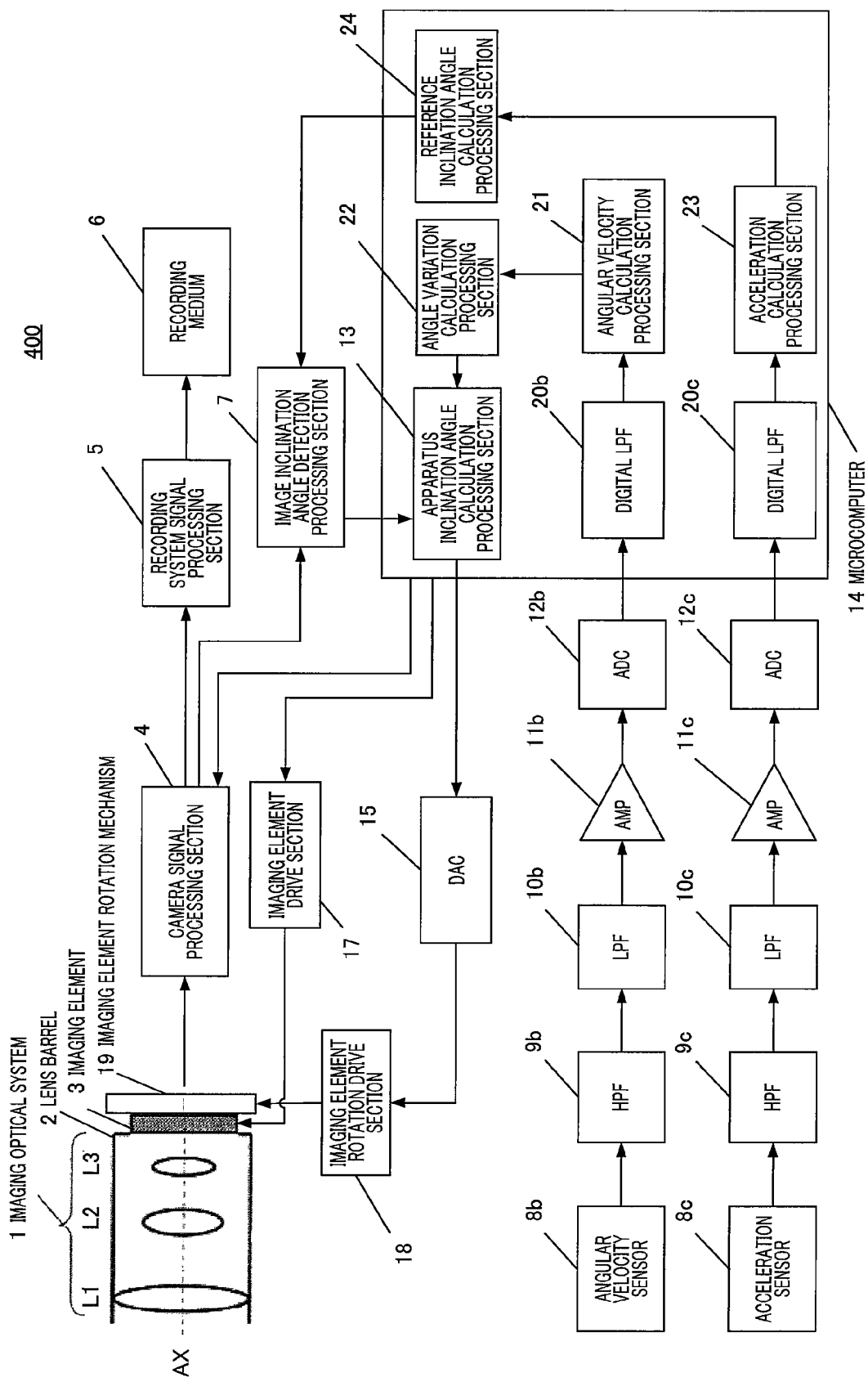
FIG. 17 is a block diagram illustrating a configuration of an imaging apparatus according to Embodiment 4 of the present invention.
Figure 18:
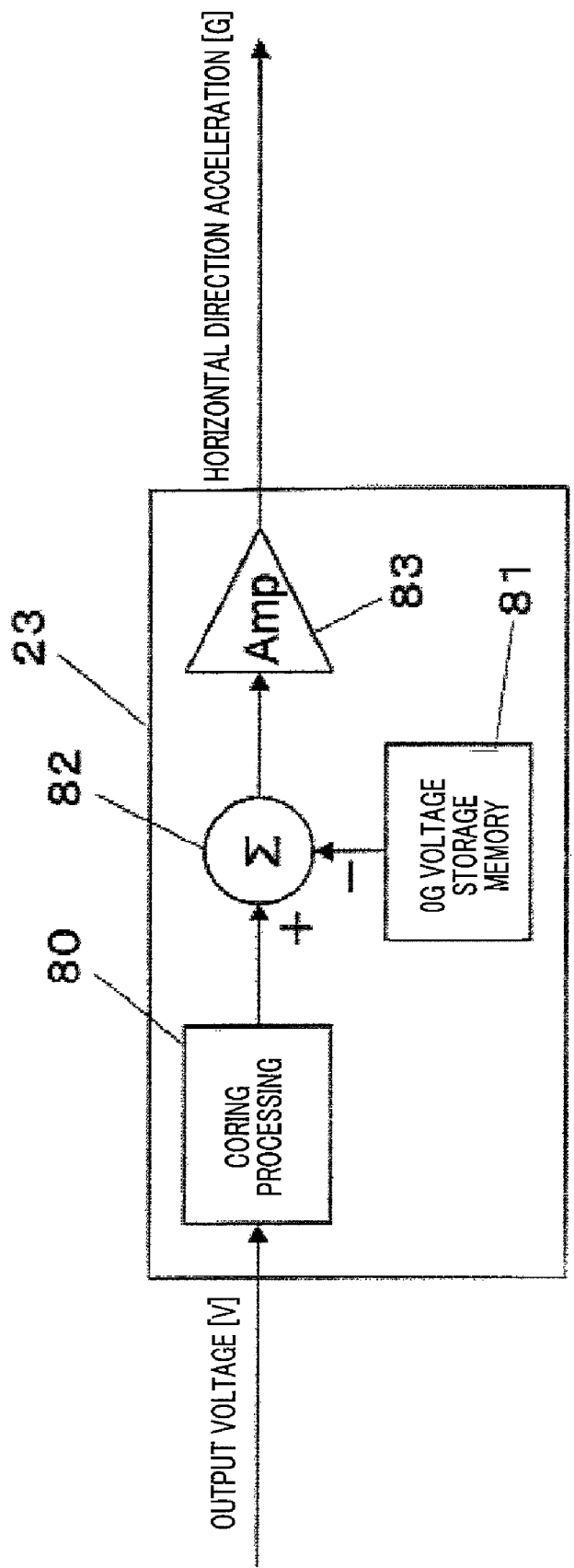
FIG. 18 is a block diagram showing acceleration calculation processing by the imaging apparatus according to Embodiment 4 of the present invention.
Figure 19:
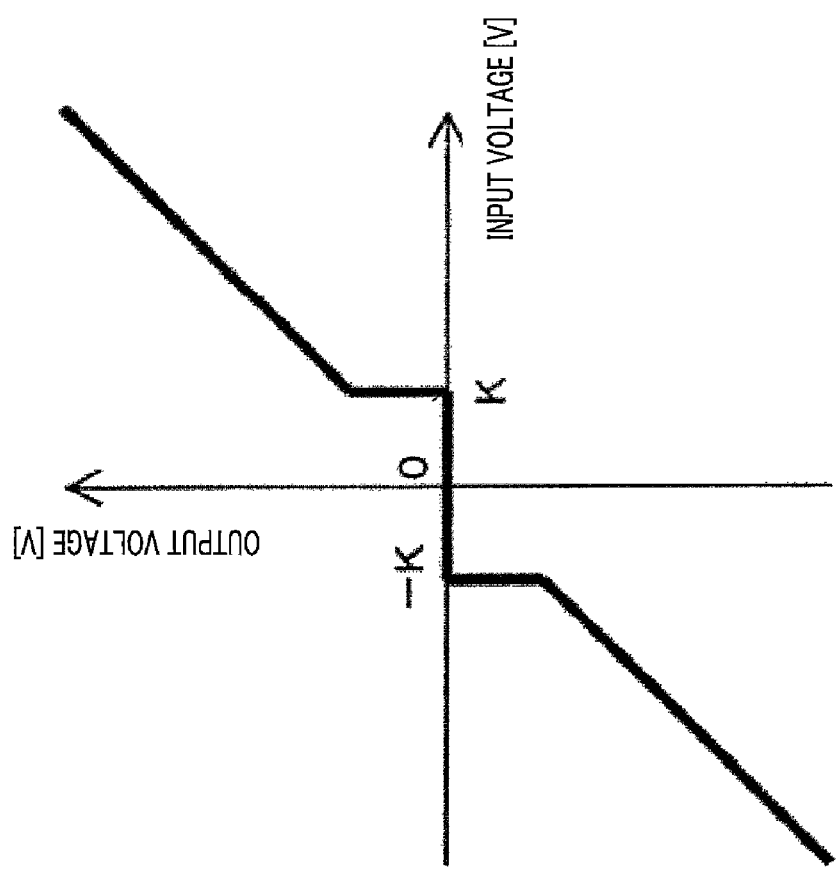
FIG. 19 illustrates input-output characteristics of the coring processing section of the imaging apparatus according to Embodiment 4 of the present invention.
Figure 20A:
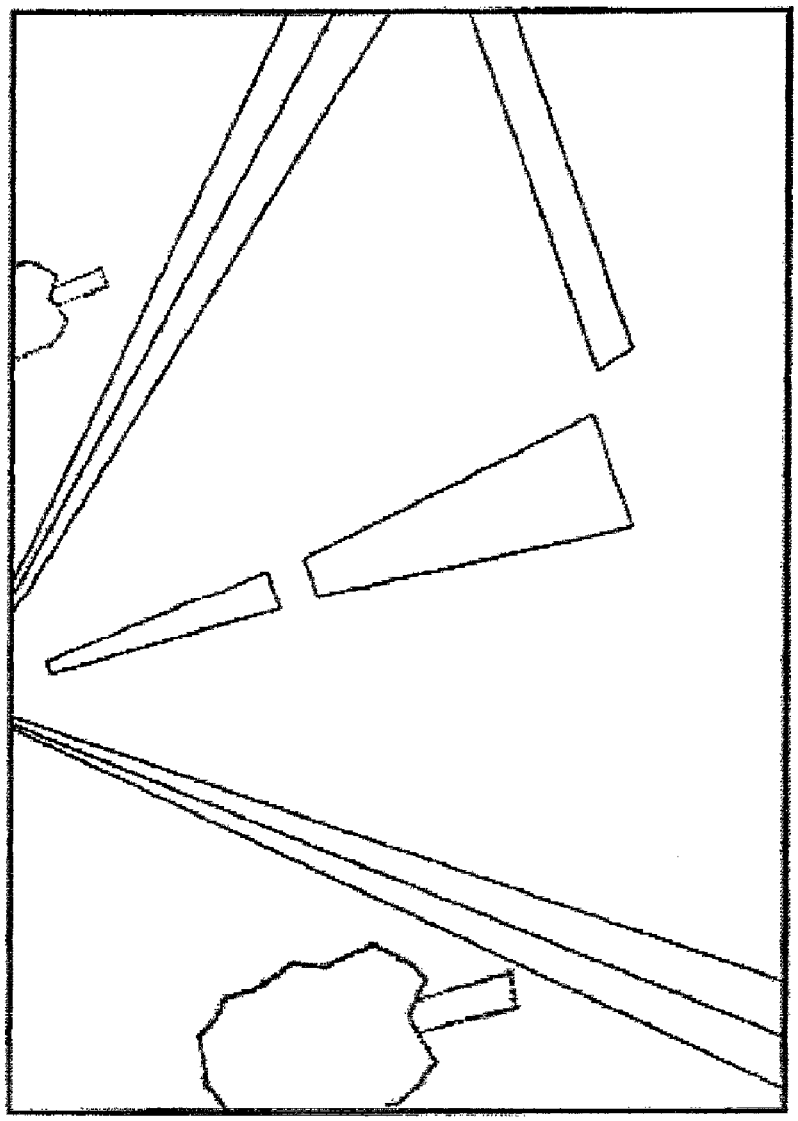
FIG. 20A illustrates a step in the inclination angle detection processing by the imaging apparatus according to Embodiment 4 of the present invention and illustrates a source image with an inclination.
Figure 20B:
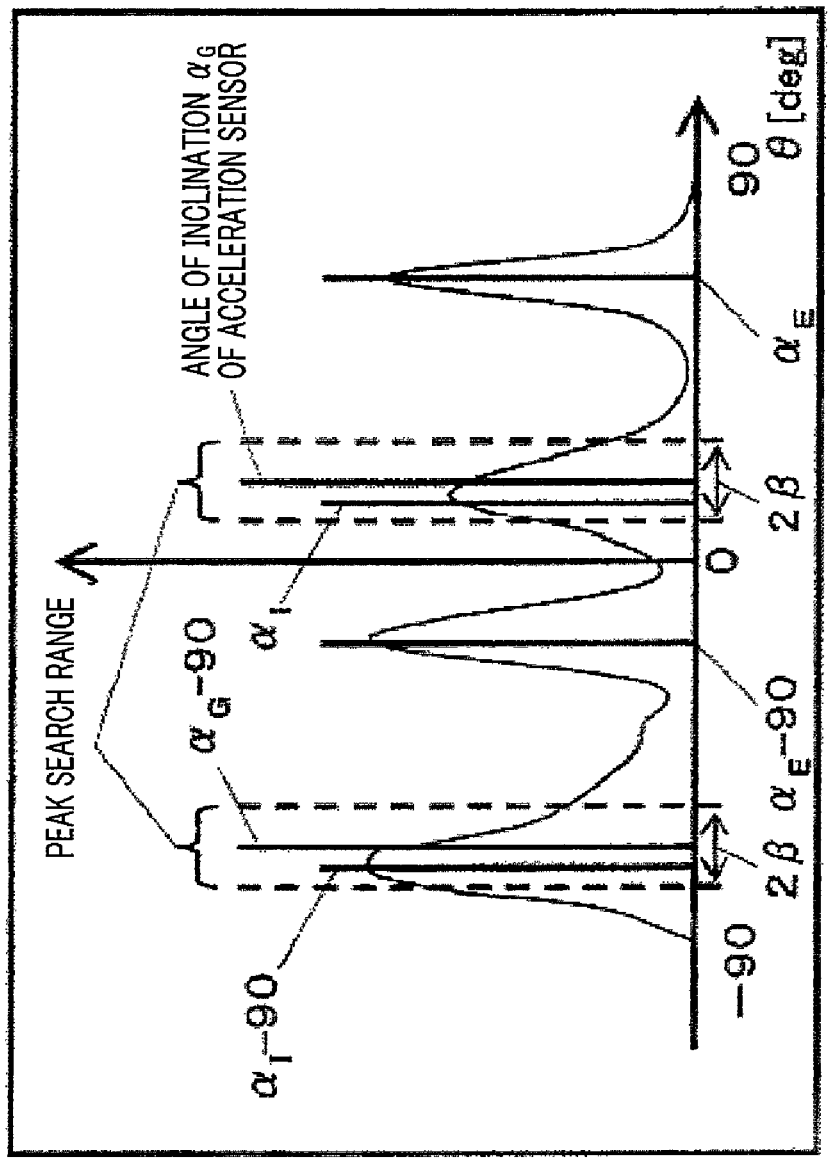
FIG. 20B illustrates a step in the inclination angle detection processing by the imaging apparatus according to Embodiment 4 of the present invention and illustrates an angle distribution of extracted line segments.
Figure 20C:
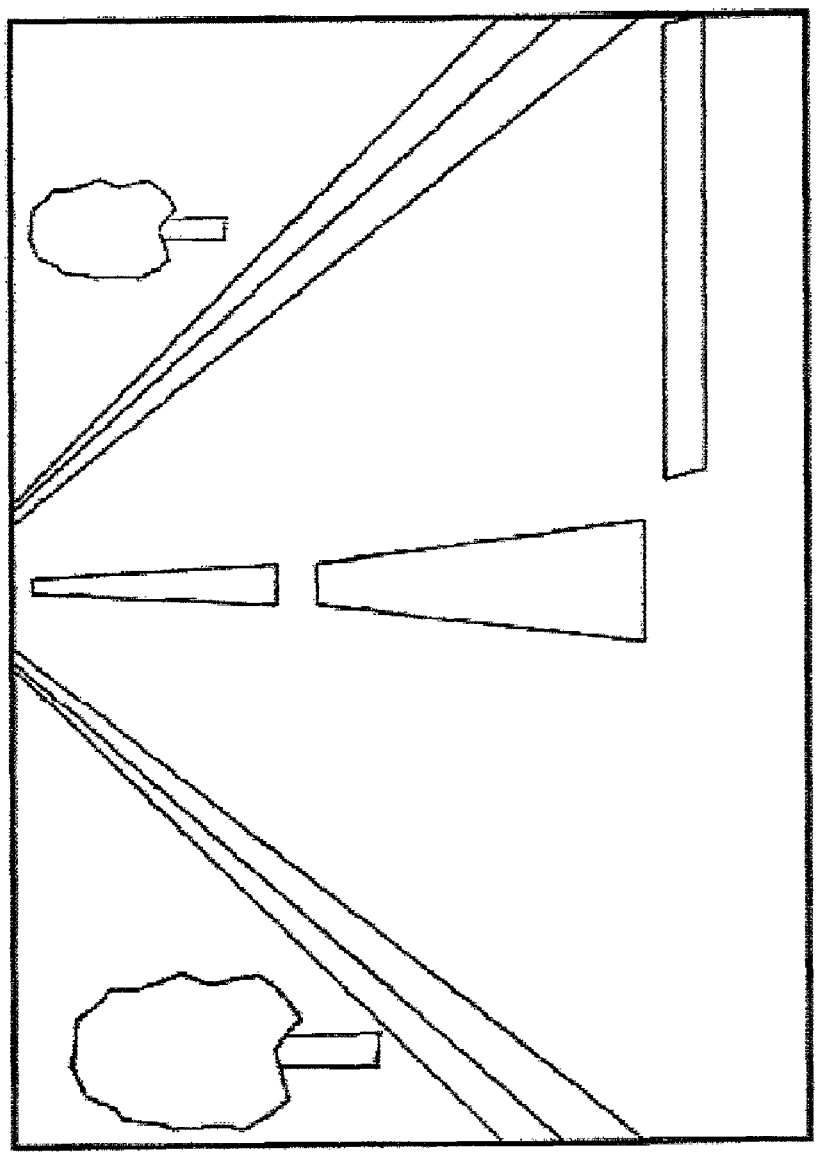
FIG. 20C illustrates a step in the inclination angle detection processing by the imaging apparatus according to Embodiment 4 of the present invention and illustrates an image after correct inclination correction.

FIG. 17 is a block diagram illustrating a configuration of imaging apparatus 400 according to Embodiment 4 of the present invention, FIG. 18 is a block diagram showing acceleration calculation processing, FIG. 19 illustrates the input-output characteristics in a coring processing section and FIG. 20A, FIG. 20B and FIG. 20C illustrate steps in the inclination angle detection processing.

Parts common to those in Embodiment 3 are assigned the same reference numerals and explanations thereof will be omitted and only differences from Embodiment 3 will be explained.

Acceleration sensor 8c is fixed at an arbitrary position of imaging apparatus 400 so as to detect acceleration in a direction perpendicular to an optical axis AX that extends from imaging apparatus 400 to the subject and corresponding to the horizontal direction of the shot image. As with the output of a gyro sensor, acceleration sensor 8c can also select between analog output and digital output. Here, a case where analog voltage output is selected will be explained. A voltage signal outputted from acceleration sensor 8c is sent to HPF 9c, LPF 10c, amplifier 11c, A/D conversion section 12c, digital LPF 20c and acceleration calculation processing section 23 in sequence and processed. Digital LPF 20c performs lowpass filtering processing to cancel mainly high frequency noise on an as-needed basis. Acceleration calculation processing section 23 converts the voltage value (described later) to acceleration.

Reference inclination angle calculation processing section 24 performs conversion of acceleration to an angle of inclination (described later). Image inclination angle detection processing section 7 performs the process of detecting the angle of inclination with respect to the horizontal of the subject in the image. The basic algorithm is the same as that explained in Embodiment 1. The difference is that the present embodiment intends to improve the accuracy of inclination angle calculation using the reference inclination value received from reference inclination angle calculation processing section 24. The detailed operation thereof will be described later. Digital LPF 20c, acceleration calculation processing section 23 and reference inclination angle calculation processing section 24, which is digital processing, are implemented inside microcomputer 14.

Hereinafter, only parts of operation of imaging apparatus 400 according to Embodiment 4 which are different from those of Embodiment 3 will be explained.

First, the processing executed by acceleration calculation processing section 23 will be explained using FIG. 18. As has already been explained, the analog voltage output of acceleration sensor 8c is subjected to pre-processing such as band restriction, noise cancellation and A/D conversion through HPF 9c, LPF 10c, amplifier 11c, A/D conversion section 12c and digital LPF 20c, and is converted to a voltage signal Va(n·Ts) [V] digitized at the sampling frequency $f_S$[Hz] by A/D conversion section 12c. Ts is a sampling cycle [sec] and n is an integer here, too. Acceleration calculation processing section 23 receives this digitized voltage signal as input. By contrast, coring processing section 80 performs the conversion expressed by equation 6 to avoid residual noise from causing measured values to fluctuate on a minute scale and adversely influencing subsequent processing. FIG. 19 shows input-output characteristics.

$$V\text{out}=0(-K<V\text{in}<K)$$

$$V\text{out}=V\text{in}(V\text{in}\leq -K, K\leq V\text{in}) \quad [6]$$

0 G voltage storage memory 81 stores output voltage value constants when acceleration sensor 8c detects 0 G. Adder 82 subtracts a 0 G voltage from a voltage signal after coring processing. Multiplier 83 multiplies this subtraction result by the reciprocal of a sensitivity constant $S_G$[V/G] and thereby obtains acceleration A.

Reference inclination angle calculation processing section 24 performs the process of calculating the angle of inclination $\alpha_G$ with respect to the optical axis AX that extends from imaging apparatus 400 toward the subject side from the acceleration A according to equation 7.

$$\alpha_G = \operatorname{Sin}^{-1} A \qquad [7]$$

Suppose the angle of inclination $\alpha_G$ calculated in this way will be referred to as the "reference angle of inclination." Image inclination angle detection processing section 7 basically performs substantially the same processing as in Embodiment 1. The difference is that, when peak detection is performed in step S5 in FIG. 4, only the vicinity of the reference angle of inclination $\alpha_G$ is searched instead of searching the whole range of ±90 degrees. This will be explained using FIG. 20A to FIG. 20C. FIG. 20A is an example of an image shot with an inclination. The feature of this image is that the difference in distribution between original line segments in the horizontal/vertical direction and diagonal line segments is small. Therefore, when processing up to an angle distribution calculation of extracted line segments according to the flowchart in FIG. 4 is performed with this image, an angle distribution schematically shown in FIG. 20B is obtained. If a whole range of ±90 degrees is searched in such a case, $\alpha_E$ may be misjudged for the image inclination angle. Therefore, the peak search range is restricted to $\alpha_G \pm \beta$ using the reference angle of inclination $\alpha_G$ as shown in FIG. 20B. This makes it possible to detect $\alpha_I$ shown in FIG. 20B as the image inclination angle and prevent errors from occurring. Here, the value of $\beta$ may be set to a value that substantially matches the inclination angle detection accuracy of the acceleration sensor. In the case of an acceleration sensor using MEMS currently available on the market, the value of $\beta$ is preferably on the order of 5 to 10 degrees.

As described above, according to Embodiment 4, even if many line segments that may cause erroneous detection in the horizontal/vertical direction are included in a shot image, it is possible to calculate the image inclination angle $\alpha_I$ accurately. Correcting the apparatus inclination angle $\alpha_S$ using the image inclination angle $\alpha_I$ obtained in this way and executing an inclination correction makes it possible to accurately obtain an image correctly held horizontal as shown in FIG. 20C.

Embodiment 4 uses a one-axis acceleration sensor, but the present invention is not limited to this. A one-axis acceleration sensor can perform detection only within a range of ±90 degrees, but when, for example, an acceleration sensor having two axes perpendicular to a direction perpendicular to the optical axis AX that extends from imaging apparatus 400 toward the subject side is used, it is possible to detect the angle of inclination within a range of ±180 degrees.

Embodiment 5

Hereinafter, imaging apparatus 500 according to Embodiment 5 of the present invention will be explained using FIG. 21 to FIG. 24. As with Embodiment 3, imaging apparatus 500 according to Embodiment 5 has a feature of being able to stably retain the horizontality of a shot image without being influenced by the postural change of the imaging apparatus and temperature variations/aging (during panning, for example). Furthermore, even if many line segments that may cause erroneous detection in the horizontal/vertical direction are included in a shot image, imaging apparatus 500 has a feature of being able to stably retain the horizontality of the shot image.

The main configuration of imaging apparatus 500 according to Embodiment 5 is the same as the configuration of Embodiment 3. The difference is that imaging apparatus 500 is provided with a camera shake correcting device to detect the reference inclination angle using an amount of drive current of an actuator in the device to improve the accuracy of image inclination angle detection processing.

Figure 21:
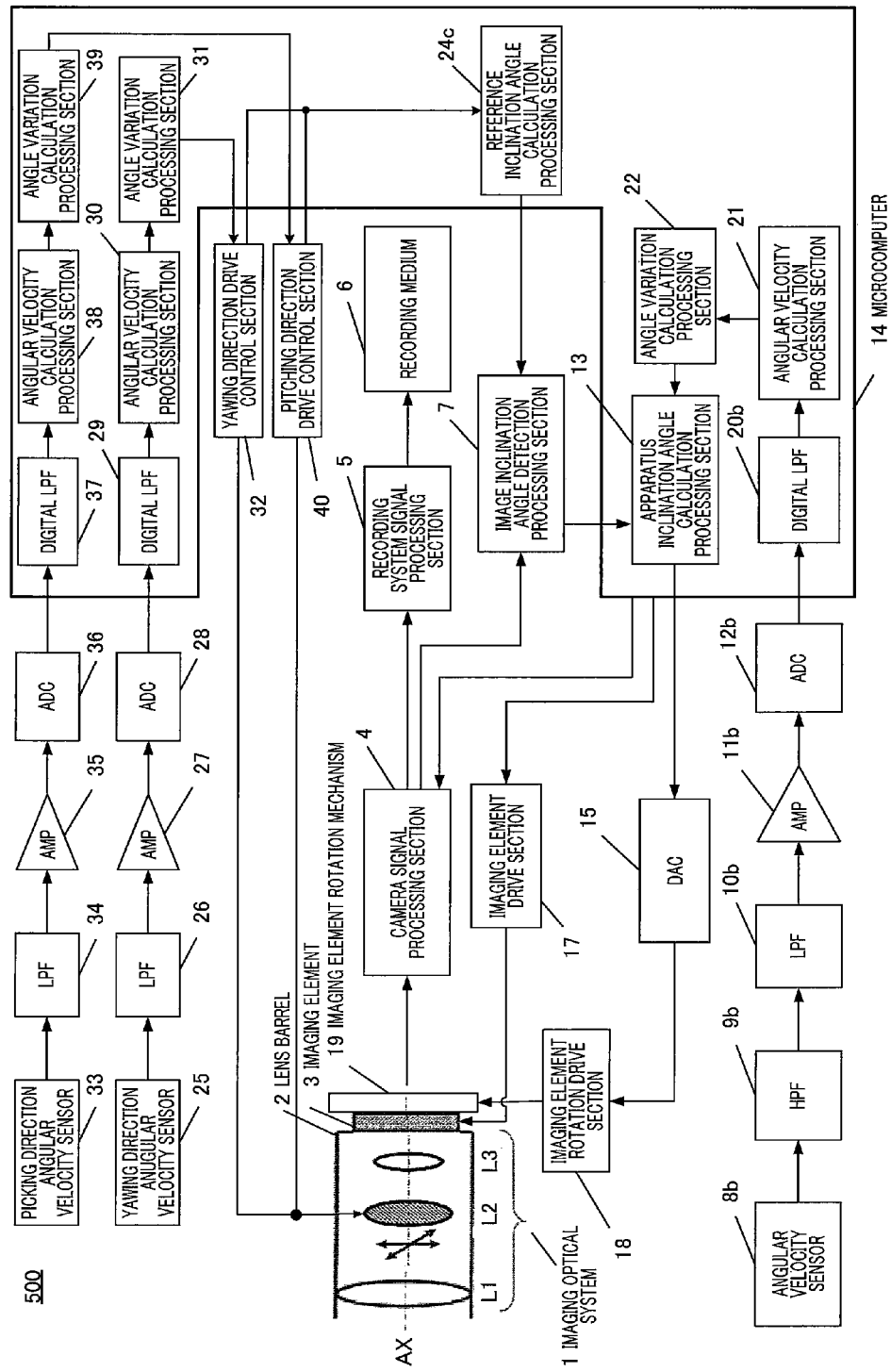
FIG. 21 is a block diagram illustrating a configuration of an imaging apparatus according to Embodiment 5 of the present invention.
Figure 22:
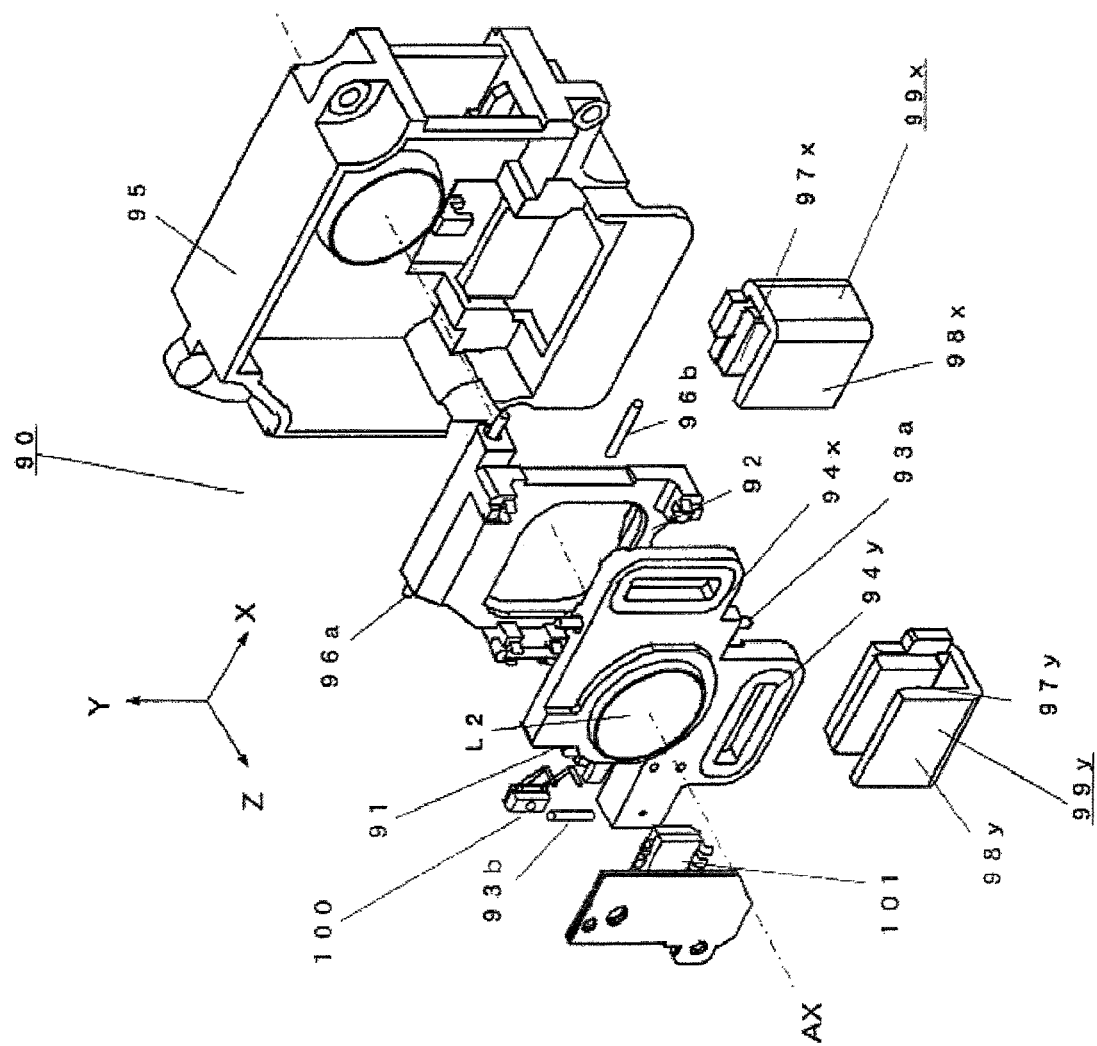
FIG. 22 is an exploded perspective view of the yawing direction drive control section and the pitching direction drive control section of the imaging apparatus according to Embodiment 5 of the present invention.
Figure 23A:
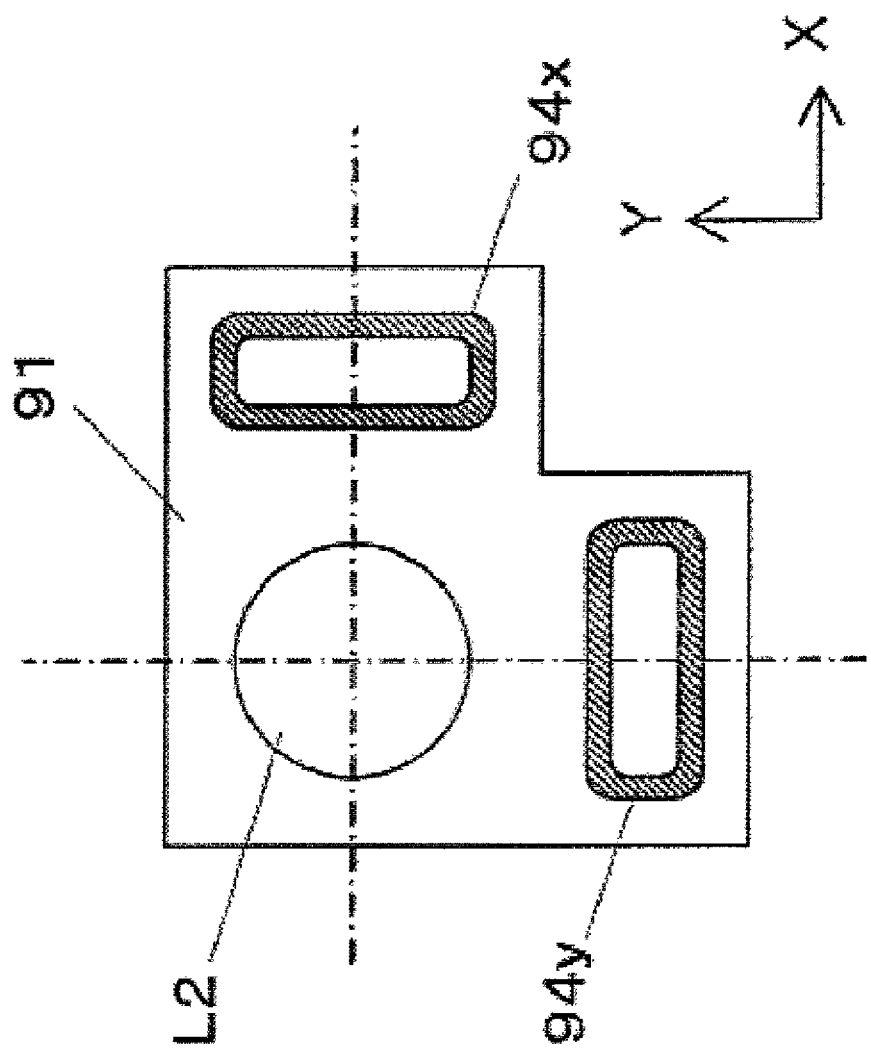
FIG. 23A illustrates a pitching holding frame when the angle of inclination of the imaging apparatus according to Embodiment 5 of the present invention is 0 degrees.
Figure 23B:
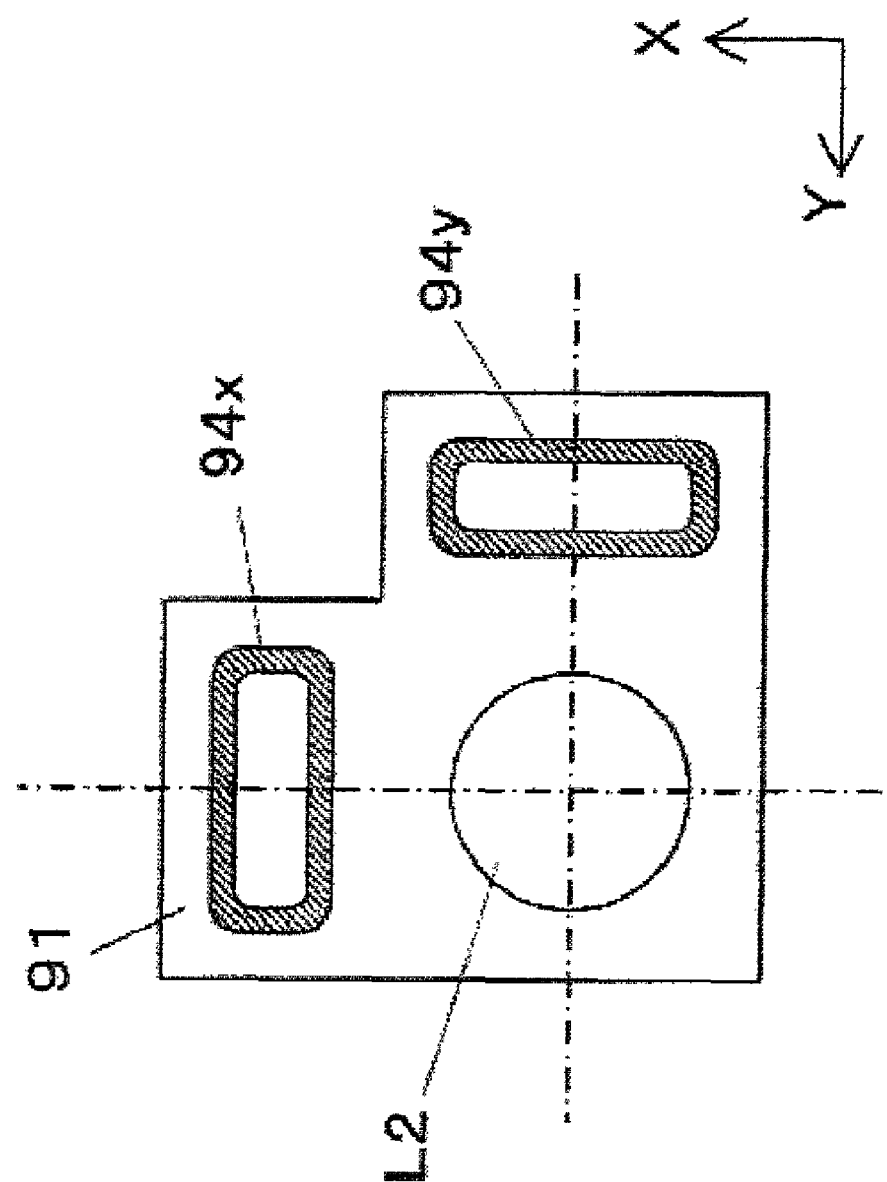
FIG. 23B illustrates the pitching holding frame when the angle of inclination of the imaging apparatus according to Embodiment 5 of the present invention is 90 degrees.
Figure 23C:
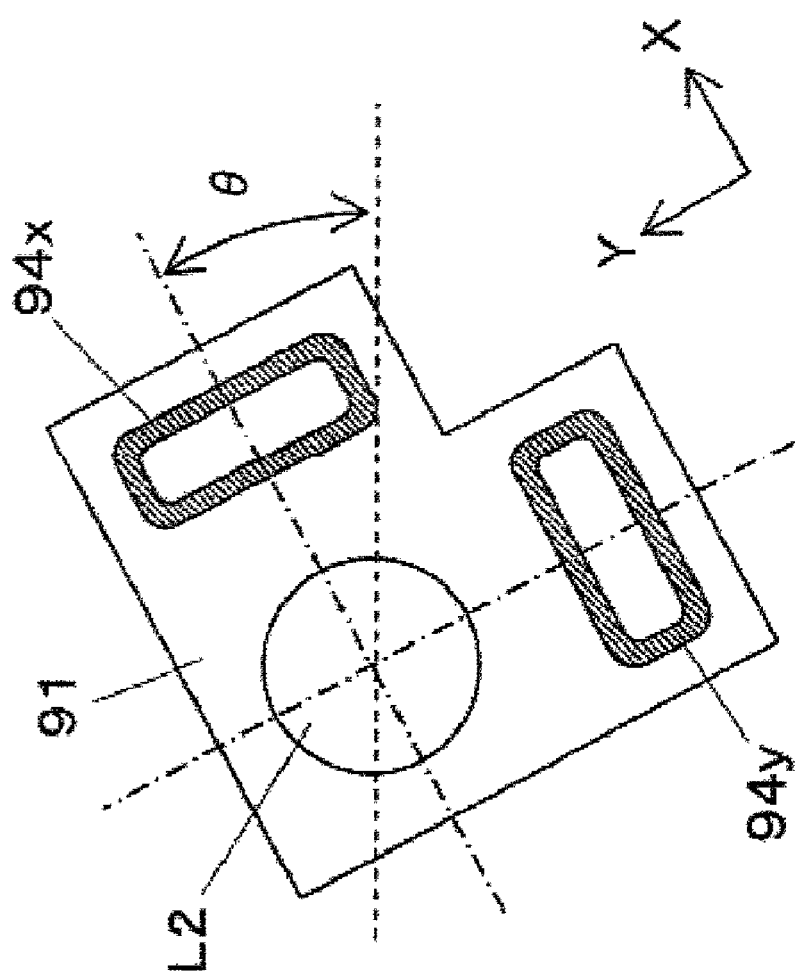
FIG. 23C illustrates the pitching holding frame when the angle of inclination of the imaging apparatus according to Embodiment 5 of the present invention is 0 degrees.
Figure 24:
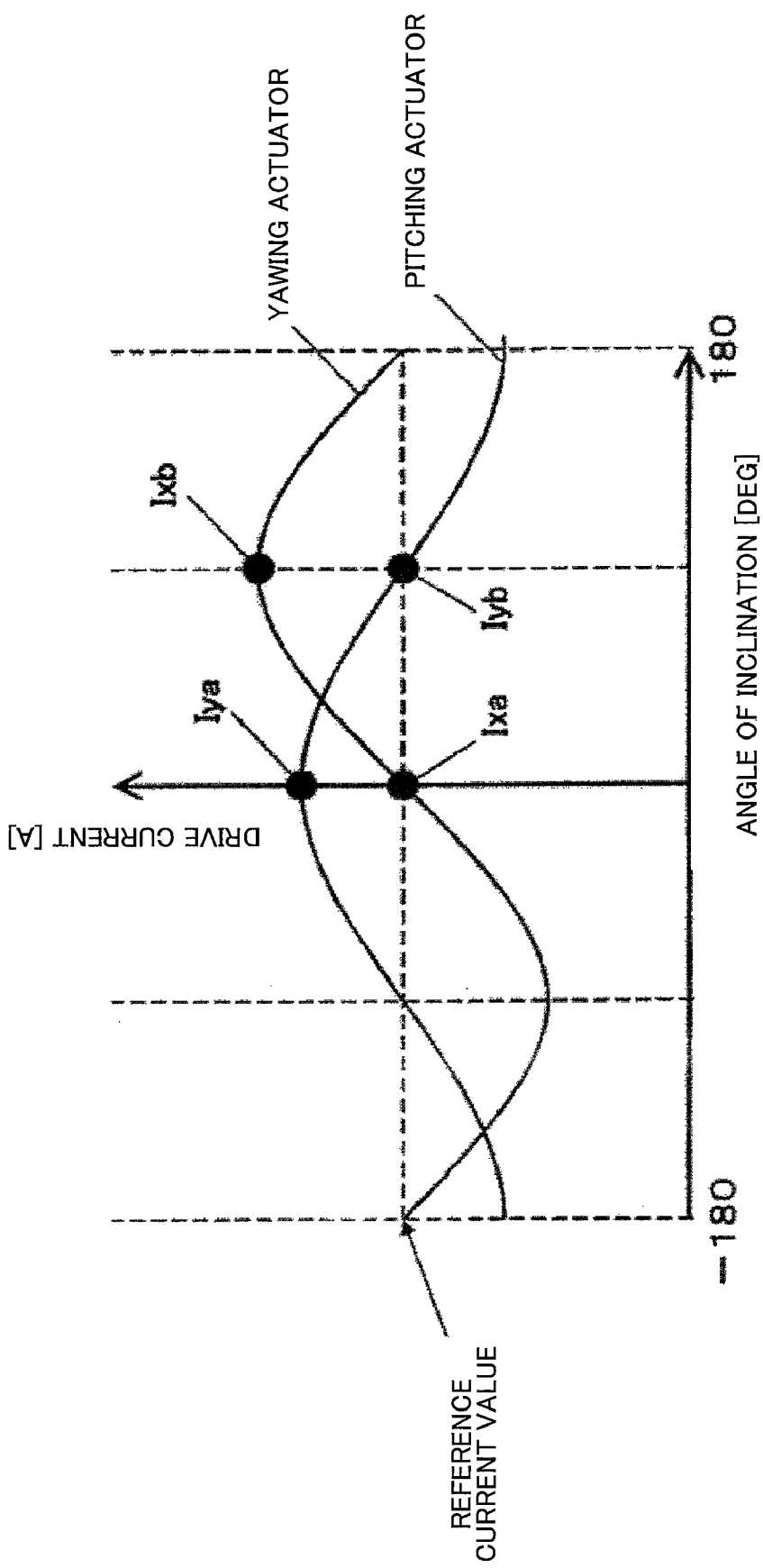
FIG. 24 illustrates the relationship between an angle of inclination and a coil drive current of the imaging apparatus according to Embodiment 5 of the present invention.

FIG. 21 is a block diagram illustrating a configuration of imaging apparatus 500 according to Embodiment 5 of the present invention, FIG. 22 is an exploded perspective view of the yawing direction drive control section and the pitching direction drive control section, FIG. 23A, FIG. 23B and FIG. 23C illustrate a relationship between the angle of inclination of imaging apparatus 500 and the pitching holding frame and FIG. 24 illustrates the relationship between the angle of inclination and a coil drive current of imaging apparatus 500. Parts common to those in Embodiment 3 are assigned the same reference numerals, explanations thereof will be omitted and only differences from Embodiment 3, or more specifically, a camera shake correcting device and a reference inclination angle calculation processing section will be explained here, too.

First, the configuration of the camera shake correcting device and the reference inclination angle calculation processing section will be explained using FIG. 21 and FIG. 22.

The camera shake correcting device detects an angle variation of imaging apparatus 500 in a yawing direction and a pitching direction with respect to the subject and corrects a shift in the optical path caused by this angle variation by driving lens group L2, one of lens groups making up imaging optical system 1, in the horizontal/vertical direction of an imaging screen. In FIG. 21, the camera shake correcting device has yawing direction angular velocity sensor 25, LPF 26, amplifier 27, A/D conversion section 28, digital LPF 29, angular velocity calculation processing section 30, angle variation calculation processing section 31, yawing direction drive control section 32, pitching direction angular velocity sensor 33, LPF 34, amplifier 35, A/D conversion section 36, digital LPF 37, angular velocity calculation processing section 38, angle variation calculation processing section 39, pitching direction drive control section 40 and imaging optical system 1. Yawing direction angular velocity sensor 25 and pitching direction angular velocity sensor 33 are so-called gyro sensors fixed at arbitrary positions of imaging apparatus 500 so as to detect the angular velocity in the yawing direction and pitching direction with respect to the subject respectively. Since the processing by LPF 26, amplifier 27, A/D conversion section 28, digital LPF 29, angular velocity calculation processing section 30, angle variation calculation processing section 31 on the output of yawing direction angular velocity sensor 25 and the processing by LPF 34, amplifier 35, A/D conversion section 36, digital LPF 37, angular velocity calculation processing section 38 and angle variation calculation processing section 39 on the output of pitching direction angular velocity sensor 33 are the same as the processing by LPF 10b, amplifier 11b, A/D conversion section 12b, digital LPF 20b, angular velocity calculation processing section 21 and angle variation calculation processing section 22 of Embodiment 3, explanations thereof will be omitted. Yawing direction drive control section 32 and pitching direction drive control section 40 drive optical axis correction lens group L2 within a plane perpendicular to the optical axis AX based on angle variations received from angle variation calculation processing section 31 and angle variation calculation processing section 39 and correct the motion of the image.

Next, details of the mechanical section of the camera shake correcting device used in Embodiment 5 will be explained using FIG. 22. In FIG. 22, camera shake correcting mechanical section 90 constitutes part of yawing direction drive control section 32 and pitching direction drive control section 40 and includes pitching holding frame 91, yawing holding frame 92, fixed frame 95, yawing actuator 99x, pitching actuator 99y, light-emitting element 100 and light-receiving element 101.

Pitching holding frame 91 includes coils 94x and 94y. Second lens group L2 and light-emitting element 100 are fixed to pitching holding frame 91. Pitching holding frame 91 is slidably held to yawing holding frame 92 in the Y direction via two pitching shafts 93a and 93b.

Yawing holding frame 92 is slidably held to fixed frame 95 in the X direction via yawing shafts 96a and 96b.

Yawing actuator 99x has magnet 97x and yoke 98x and is held to fixed frame 95. Likewise, pitching actuator 99y has magnet 97y and yoke 98y and is held to fixed frame 95.

Light-receiving element 101 is fixed to fixed frame 95, receives projected light of light-emitting element 100 and detects two-dimensional position coordinates.

Furthermore, yawing direction drive control section 32 includes a yawing current value detecting section (not shown) that detects a value of a current that flows in coil 94x when yawing actuator 99x operates and transfers a yawing current value to Reference inclination angle calculation processing section 24c. Likewise, pitching direction drive control section 40 includes a pitching current value detecting section (not shown) that detects a value of a current that flows in coil 94y when pitching actuator 99y operates and transfers a pitching current value to Reference inclination angle calculation processing section 24c.

Reference inclination angle calculation processing section 24c calculates the angle of inclination of imaging apparatus 500 (described later) using the yawing current value and pitching current value received from yawing direction drive control section 32 and pitching direction drive control section 40.

Furthermore, digital LPF 29, angular velocity calculation processing section 30, digital LPF 37, angular velocity calculation processing section 38, angle variation calculation processing section 31, angle variation calculation processing section 39 and Reference inclination angle calculation processing section 24c, which are digital processing, are implemented within microcomputer 14.

Next, operations of the camera shake correcting device and Reference inclination angle calculation processing section 24c of imaging apparatus 500 according to Embodiment 5 will be explained using FIG. 21 and FIG. 22.

When imaging apparatus 500 is in operation, the camera shake or vibration added to imaging apparatus 500 is detected by yawing direction angular velocity sensor 25 and pitching direction angular velocity sensor 33. As has already been described, the respective detected voltages are converted to angle variations and sent to yawing direction drive control section 32 and pitching direction drive control section 40. Yawing direction drive control section 32 and pitching direction drive control section 40 generate control signals to cancel the camera shake or the like based on the received angle variations and drive camera shake correcting mechanical section 90. Currents corresponding to these control signals are supplied to coils 94x and 94y of pitching holding frame 91 respectively. Pitching holding frame 91 moves within the plane of two directions X and Y perpendicular to the optical axis AX by the currents supplied and a magnetic circuit formed with magnets 97x and 97y. Furthermore, the position of pitching holding frame 91 is detected accurately using light-receiving element 101. That is, camera shake correcting mechanical section 90 causes second lens group L2 to move within a plane with the two perpendicular to the optical axis. This allows shake correction in the horizontal and vertical directions of an image that enters imaging element 3 via imaging optical system 1.

Furthermore, when camera shake correcting drive is performed, the values of currents flowing in coils 94x and 94y are sent to Reference inclination angle calculation processing section 24c. The current values in this case will be explained using FIG. 23A to FIG. 23C and FIG. 24. FIG. 23A schematically illustrates pitching holding frame 91 in imaging apparatus 500 held in a position with an angle of inclination of 0 degrees, when viewed from the imaging element side. In order to keep lens group L2 in a predetermined position, with respect to the Y direction, it is necessary to apply a drive current Iya to coil 94y so as to lift its self weight since the sum of mass My of lens group L2, pitching holding frame 91, coils 94x and 94y and light-emitting element 100 applies to the gravity direction (−Y direction). On the other hand, with respect to the X direction, the self weight to keep lens group L2 in the predetermined position need not be considered. That is, no drive force is necessary to only support lens group L2 and the reference current Ixa corresponding to drive force 0 may be applied to coil 94x. When camera shake correcting mechanical section 90 is driven, a current which is necessary and enough to drive camera shake correcting mechanical section 90 may be applied to coil 94x against the frictional resistance generated when the sum of mass Mx of lens group L2, pitching holding frame 91, coils 94x and 94y, light-emitting element 100, and yawing holding frame 92, pitching shafts 93a and 93b is applied between yawing holding frame 92, and yawing shafts 96a and 96b.

FIG. 23B schematically illustrates pitching holding frame 91 in imaging apparatus 500 held in a position with an angle of inclination of 90 degrees, when viewed from the imaging element side. In this case, in order to keep lens group L2 in a predetermined position, with respect to the X direction, it is necessary to apply a drive current Ixb to coil 94x to lift its self weight since the sum of mass Mx of lens group L2, pitching holding frame 91, coils 94x and 94y, light-emitting element 100, yawing holding frame 92, pitching shaft, 93a and 93b applies to the gravity direction (−X direction). On the other hand, with respect to the Y direction, the self weight to keep lens group L2 in the predetermined position need not be considered. That is, no drive force is necessary to only support lens group L2 and the reference current Iyb corresponding to drive force 0 may be applied to coil 94y. When camera shake correcting mechanical section 90 is driven, a current which is necessary and enough to drive camera shake correcting mechanical section 90 may be applied to coil 94y against the frictional resistance generated when the sum of mass My of lens group L2, pitching holding frame 91, coils 94x and 94y, light-emitting element 100 is applied between pitching holding frame 91, and pitching shafts 93a and 93b. Since My<Mx, a relation Iya<Ixb holds.

FIG. 23C schematically illustrates pitching holding frame 91 in imaging apparatus 500 held in a position with an angle of inclination of θ degrees, when viewed from the imaging element side. In this case, in order to keep lens group L2 in a predetermined position, with respect to the Y direction, it is necessary to cause a drive current Iyc to flow to cancel out the sum of the component of force (force to keep position) corresponding to the angle θ of the sum of mass My and the component of force (force to drive) corresponding to the angle θ of frictional resistance generated between pitching holding frame 91, and pitching shafts 93a and 93b. On the other hand, with respect to the X direction, it is necessary to cause a drive current Ixc to flow to cancel out the sum of the component of force (force to keep position) corresponding to the angle θ of the sum of mass Mx and the component of force (force to drive) corresponding to the angle θ of frictional resistance generated between yawing holding frame 92, and yawing shafts 96a and 96b. Summarizing the descriptions so far, median values of the drive currents (drive currents in a stationary position) applied to coils 94x and 94y to hold lens group L2 in a predetermined position are as shown in FIG. 24.

Reference inclination angle calculation processing section 24c stores reference current values and maximum current values of the respective drive currents applied to coils 94x and 94y beforehand. Using these values, the drive current values in two directions received from yawing direction drive control section 32 and pitching direction drive control section 40 are normalized and the angle of inclination is calculated from the ratio therebetween. This is handed over to image inclination angle detection processing section 7 as the reference inclination angle.

Image inclination angle detection processing section 7 executes processing similar to the processing explained in Embodiment 4 using the reference angle of inclination received from Reference inclination angle calculation processing section 24c.

As described above, according to Embodiment 5, even if many line segments that may cause erroneous detection in the horizontal/vertical direction are included in a shot image, it is possible to calculate the image inclination angle $α_I$ accurately. It is possible to correct the apparatus inclination angle $α_S$ using the image inclination angle $α_I$ calculated in this way, perform inclination correction and accurately obtain an image correctly kept horizontal.

Other Embodiments

The subject matter of the present invention are not limited to the specific examples shown in the aforementioned embodiments. For example, the following modification examples are also conceivable.

(1) As the sensor for detecting the angle of inclination of the imaging apparatus, an angle sensor or inclination sensor with a built-in pendulum-shaped structure, acceleration sensor for detecting acceleration of gravity or the like or angular velocity sensor for detecting a rotation angular velocity is used, but the present invention is not limited to any of these sensors.

(2) According to the embodiments of the present invention, angle sensor 8 defines the direction that forms an angle of 90 degrees with respect to the direction of gravity (vertical direction) as the horizontal direction, defines this as the reference angle (angle=0 degrees) and outputs angle signals in both positive and negative directions according to the magnitude and direction of inclination of the imaging apparatus. However, the present invention is not limited to this. The magnitude and direction of inclination of the imaging apparatus may be detected using the vertical direction as the reference angle (angle=0 degrees).

Figure 25:
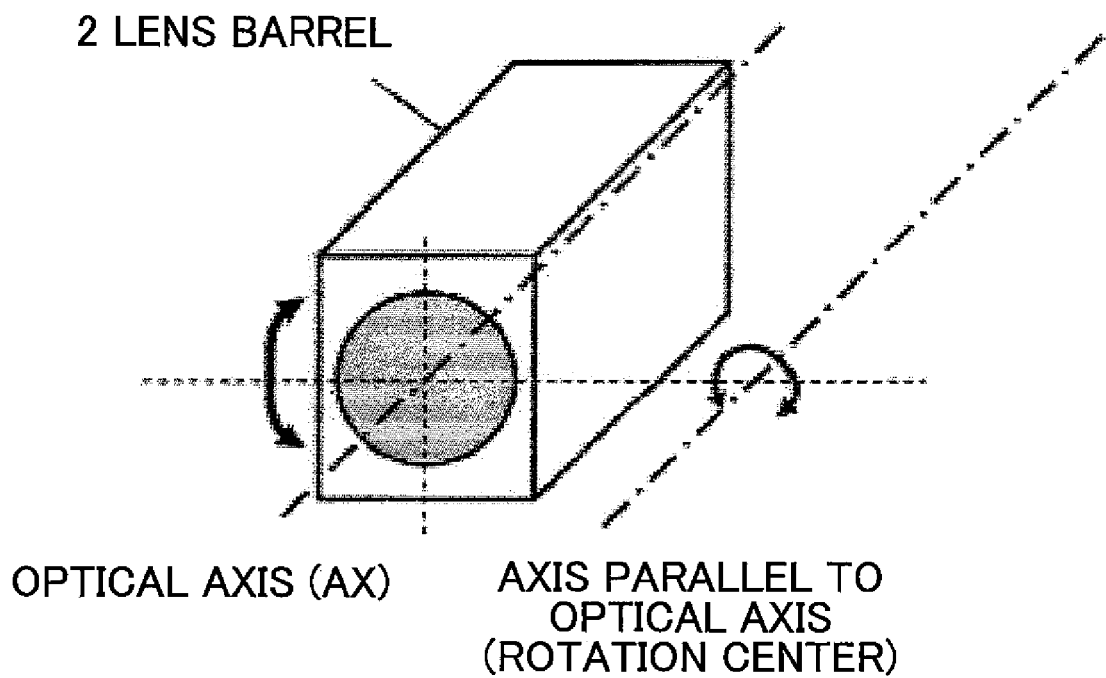
FIG. 25 is a schematic view of another example illustrating the lens barrel and the rotation direction thereof of the imaging apparatus according to Embodiment 5 of the present invention.

(3) The embodiments of the present invention have described the configuration in which lens barrel 2 or imaging element 3 is made to rotate about the optical axis of imaging optical system 1 when correcting an inclination. However, the present invention is not limited to this. For example, even when lens barrel 2 or imaging element 3 is made to rotate about an axis parallel to the optical axis as shown in FIG. 25, the inclination of a shot image can also be corrected. In the present invention, lens barrel 2 or imaging element 3 may also be made to rotate about the axis parallel to the optical axis of imaging optical system 1.

(4) The embodiments of the present invention have described the configuration in which an inclination correction by barrel rotation drive section 16 or imaging element rotation drive section 18 does not operate until image inclination angle detection processing section 7 outputs an inclination detection result from an image as shown in FIG. 7 first. However, the present invention is not limited to this. For example, until the first inclination detection result from the image by image inclination angle detection processing section 7 is outputted, the inclination of the shot image may be corrected according to the angle signal obtained from angle sensor 8a and the angle of inclination calculated from an initial conversion equation.

Figure 26:
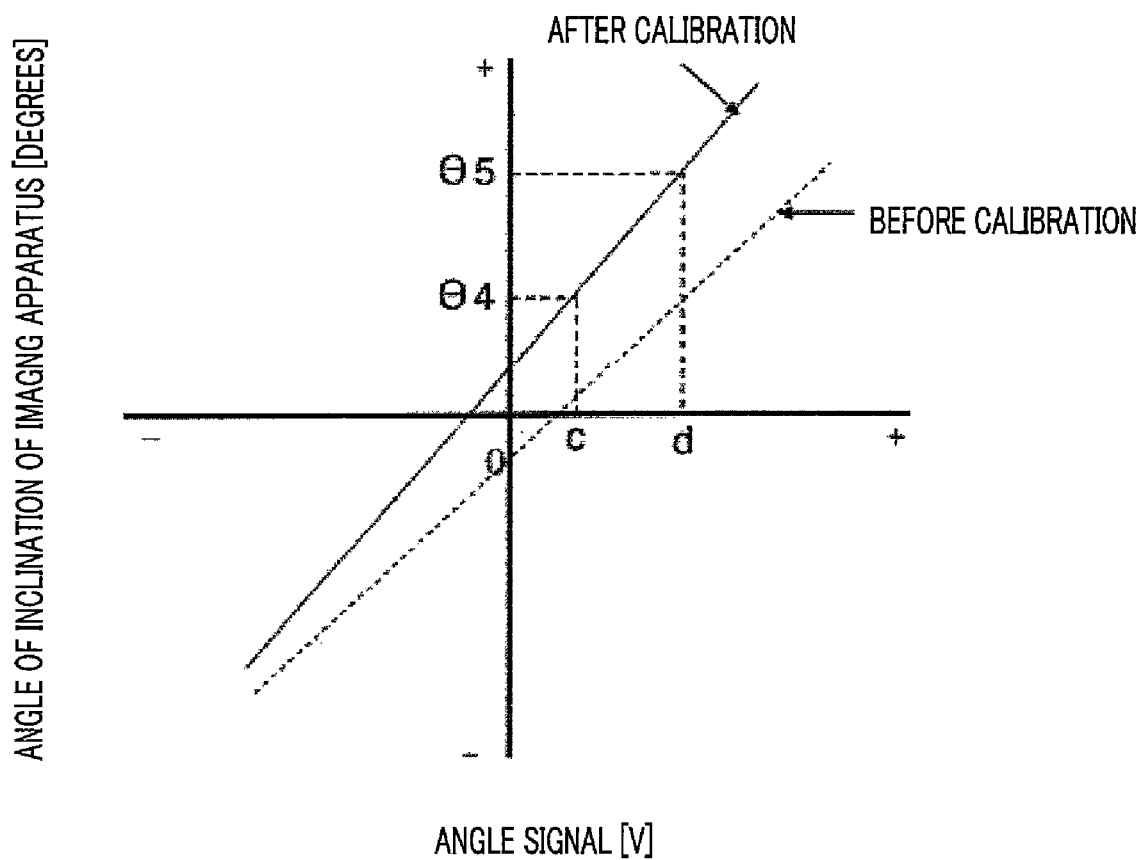
FIG. 26 is a graph illustrating another method of updating the conversion equation for converting an angle signal of the imaging apparatus to an angle according to Embodiment 5 of the present invention.

(5) In the embodiments of the present invention, FIG. 8 and FIG. 9 are presented as examples of the relational expression for converting the angle signal obtained from angle sensor 8a to an angle. However, the present invention is not limited to this. For example, the relational expression may also be expressed by a straight line which does not pass through the origin point as shown in FIG. 26. Of course, the relational expression may be quadratic or of higher order. Furthermore, in the case of a relational expression expressed by a straight line which does not pass through the origin point or quadratic or of higher order, when the conversion equation is calibrated, the conversion equation may be calibrated using a plurality of inclination detection results from an image detected from image inclination angle detection processing section 7.

(6) The embodiments of the present invention have described that image inclination angle detection processing section 7 detects the inclination from an image in every shooting cycle. However, the present invention is not limited to this. It is effective to set the shooting cycle arbitrarily in consideration of the characteristics and performance of the angle sensor used in the embodiments. In this case, if the cycle of inclination detection from the image by image inclination angle detection processing section 7 is reduced, a new effect such as reduced power consumption of the apparatus can be realized.

(7) The embodiments of the present invention have presented an example of program processing using microcomputer 14. However, the present invention is not limited to this. It goes without saying that the program processing by microcomputer 14 can be realized by hardware such as electronic circuitry.

(8) The embodiments of the present invention have not particularly mentioned the number of imaging elements of the imaging apparatus. However, it is obvious that the present invention is also effective for one of a single-plate imaging apparatus, double-plate imaging apparatus and triple-plate imaging apparatus.

(9) The embodiments of the present invention have described the configuration in which lens barrel 2 or imaging element 3 is made to rotate as the inclination correcting section. However, the present invention is not limited to this. For example, such a configuration may also be adopted that a pan head that fixes the imaging apparatus is made to rotate to correct an inclination. In this case, such a configuration may be adopted that a control signal for driving the rotation of the pan head is outputted outside the imaging apparatus and driving of the pan head is controlled based thereon. Furthermore, in addition to the mechanical configuration, an image signal may be subjected to image processing and the image may be rotated so as to correct the angle of inclination instead of driving the rotation of imaging element 2 as the method of retaining the horizontality of a shot image.

The disclosure of Japanese Patent Application No. 2007-183957, filed on Jul. 13, 2007, including the specification, drawings and abstract, is incorporated herein by reference in its entirety.

INDUSTRIAL APPLICABILITY

The present invention is applicable to an imaging apparatus having an inclination correcting function such as a digital camera and video movie.

The invention claimed is:

1. An imaging apparatus comprising an imaging optical system that forms an optical image of a subject and an imaging element that receives the optical image formed, converts the image to an electrical image signal and outputs the image signal, the imaging apparatus comprising:
   an apparatus inclination angle detecting section that detects an angle of inclination of the imaging apparatus in a rolling direction;
   an image inclination angle detecting section that detects an angle of inclination of the image received from the image signal in the rolling direction;
   an apparatus inclination angle calculation section that calculates an apparatus inclination angle by calibrating a detection result in the apparatus inclination angle detecting section using the angle of inclination of the image detected in the image inclination angle detecting section; and
   an inclination correcting section that corrects an inclination of the imaging apparatus based on a calculation result in the apparatus inclination angle calculation section.

2. The imaging apparatus according to claim 1, wherein the inclination correcting section rotates the imaging element about an optical axis or about an axis parallel to the optical axis or rotates the electrical image, based on a calculation result in the apparatus inclination angle calculation section.

3. The imaging apparatus according to claim 2, further comprising a lens barrel that houses the imaging optical system and has the imaging element fixed thereto, wherein:
   the inclination correcting section rotates the imaging element about the optical axis or about the axis parallel to the optical axis based on the calculation result in the apparatus inclination angle calculation section.

4. The imaging apparatus according to claim 2, wherein the inclination correcting section rotates the imaging element about the optical axis or about the axis parallel to the optical axis so that a horizontal or vertical direction of the image converted to the image signal matches a horizontal or vertical direction of the subject.

5. The imaging apparatus according to claim 2, wherein the inclination correcting section starts an operation of rotating the imaging element about the optical axis or about the axis parallel to the optical axis after first calibration is completed.

6. The imaging apparatus according to claim 1, further comprising:
   an apparatus acceleration detecting section that detects acceleration in at least one axis perpendicular to the optical axis of the imaging optical system from the imaging apparatus toward the subject; and
   a reference inclination angle calculation section that calculates an angle of inclination of the subject in the rolling direction using acceleration outputted from the apparatus acceleration detecting section, wherein:
   the image inclination angle detecting section receives the angle of inclination outputted from the reference inclination angle calculation section as an input value.

7. The imaging apparatus according to claim 1, further comprising:
   a camera shake correcting device having first and second actuators that drive a camera shake correcting section in two directions perpendicular to the optical axis of the imaging optical system; and
   a reference inclination angle calculation section that calculates an angle of inclination of the subject in the rolling direction by using drive current values of the first and second actuators as input, wherein:
   the image inclination angle detecting section receives the angle of inclination outputted from the reference inclination angle calculation section as an input value.

8. The imaging apparatus according to claim 1, wherein the apparatus inclination angle detecting section is one of an inclination sensor, an acceleration sensor and an angular velocity sensor.

9. The imaging apparatus according to claim 1, wherein the apparatus inclination angle detecting section is an angular velocity sensor, the imaging apparatus further comprising an angle variation calculation section that an angle variation in the rolling direction by integrating an apparatus inclination angle detection result, wherein:
   the apparatus inclination angle calculation section calculates the apparatus inclination angle by calibrating the angle variation using the image inclination angle detected in the image inclination detecting section.

10. The imaging apparatus according to claim 9, wherein:
    the apparatus inclination angle calculation section comprises:
    an apparatus inclination angle storage memory that stores the angle of inclination outputted from the apparatus inclination angle calculation section;
    a difference calculator that calculates a difference between the angle of inclination outputted from the apparatus inclination angle storage memory and the angle of inclination outputted from the image inclination angle detecting section;
    a difference value storage memory that stores an output of the difference calculator; and
    a correction value calculation section that calculates a correction value to be added to the angle variation using an output of the difference value storage memory; and
    the apparatus inclination angle calculation section updates content stored in the difference value storage memory according to an operation timing of the image inclination angle detecting section and updates the apparatus inclination angle storage memory according to an operation timing of the imaging element.

11. The imaging apparatus according to claim 10, wherein the correction value calculation section comprises:
    a multiplier that multiplies the output of the difference value storage memory by a value obtained by dividing an operation frequency of the image inclination angle detecting section by an operation frequency of the angle variation calculation section; and
    an integrator that adds up outputs from the multiplier.

* * * * *